US009426026B2

(12) United States Patent
Rider

(10) Patent No.: US 9,426,026 B2
(45) Date of Patent: *Aug. 23, 2016

(54) CLUSTER CONFIGURATION

(71) Applicant: VMware, Inc., Palo Alto, CA (US)

(72) Inventor: Eric Rider, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,489

(22) Filed: Aug. 5, 2014

(65) Prior Publication Data

US 2015/0081856 A1 Mar. 19, 2015

Related U.S. Application Data

(63) Continuation of application No. 12/686,753, filed on Jan. 13, 2010, now Pat. No. 8,799,418.

(51) Int. Cl.
G06F 15/177 (2006.01)
H04L 12/24 (2006.01)
G06F 9/445 (2006.01)
G06F 9/455 (2006.01)

(52) U.S. Cl.
CPC ....... H04L 41/0803 (2013.01); G06F 9/44505 (2013.01); G06F 9/45533 (2013.01)

(58) Field of Classification Search
None
See application file for complete search history.

(56) References Cited

U.S. PATENT DOCUMENTS

| 6,393,485 | B1 | 5/2002 | Chao et al. |
| 6,549,516 | B1 | 4/2003 | Albert et al. |
| 8,631,410 | B2* | 1/2014 | Fu et al. ........................ 718/102 |
| 2006/0085785 | A1 | 4/2006 | Garrett |
| 2006/0218275 | A1 | 9/2006 | Labio et al. |
| 2008/0189468 | A1 | 8/2008 | Schmidt et al. |
| 2011/0173302 | A1 | 7/2011 | Rider |
| 2011/0173303 | A1 | 7/2011 | Rider |
| 2014/0020066 | A1* | 1/2014 | Vashist et al. .................... 726/4 |

* cited by examiner

Primary Examiner — Mohamed Ibrahim

(57) ABSTRACT

Computer implemented methods, system and apparatus for configuring a cluster using a plurality of hosts include identifying a plurality of features for forming the cluster. The plurality of features define requirements needed in a host for forming the cluster. A plurality of hosts are identified to be part of the cluster. A compatibility analysis is executed for each of the identified hosts. A plurality of suggested adjustments to particular hosts are presented to enable the particular hosts to be compatible with the features requirements. A configuration template is constructed for the hosts in the cluster that are compatible with the requirements. The hosts are configured for the cluster using the configuration settings in the configuration template. The configured hosts enable the features in the cluster.

20 Claims, 28 Drawing Sheets

Hosts Detail

Hosts
Drag hosts from the datacenter to the Cluster host pool to create a group of hosts to be added to the cluster. We will alert you of possible issues when they arise. Why do my hosts need to be compatible?

Details

| | |
|---|---|
| Host Name: | 1.vmware.com |
| Manufacturer: | Dell Inc. |
| Model: | PowerEdge 1200 |
| Processors: | 4 CPU x 3 GHZ |
| Processor Cores: | 4 |
| Processor Type: | Intel(R) Xeon(R) CPU |
| Hyperthreading: | Inactive |
| Number of NICs: | 3 |
| Network Adapters: | Broadcom NetXtreme II BCM57008 1000Base-T |
| NIC Speed: | 1000Base-T, 1000Base-T, 1000Base-T |
| Storage Adapters: | HBA |
| Datastores: | Storage1, Storage2, Storage 3 |
| Virtual Machines: | 3 |
| VM Network: | None |

Features: High Availability | VMware DRS
Hosts: 0 Hosts in Cluster
Networks: 0 management networks | 0 VM Network | 0 Vmotion Network < Back    Continue >

1. user clicks on the host name link to pop up details about that host this give
2. the list shown here is a starting point. we need to talk to users to see what kind of details they really want here

Incompatible Host and Issues

Hosts
Drag hosts from the datacenter to the Cluster host pool to create a group of hosts to be added to the cluster. We will alert you of possible issues when they arise. Why do my hosts need to be compatible?

Summary
- Features: High Availability | VMware DRS
- Hosts: 5 Hosts | 2 Issues
- Network: 0 management networks | 0 VM Network | 0 Vmotion Network
- Storage: No Storage

Hosts in cluster:
- 2.vmware.com — Incompatible Host
- 5.vmware.com — Vmotion Issue
- 1.vmware.com
- 3.vmware.com
- 4.vmware.com

Details — Vmotion Issue
Some hosts do not meet the bandwidth requirements needed for Vmotion.
How can I resolve this?
List of Hosts: 4.vmware.com

Details — Incompatible Processors.
This cluster contains hosts with processors that are not Vmotion compatible. One or more hosts will not be vmotion compatible with the majority of your cluster. Learn More
List of Hosts: 4.vmware.com

- 1-Incompatible Issue
- 1-Possible Issue

[< Back]   [Continue >]

---

1. In the host in cluster list issues and errors are sorted to the top of the list. This is opposite behavior from the possible hosts lists. In the possible hosts lists we want to discourage the user from picking a host with an issue, where as in the Hosts in cluster list we want to make sure the user sees the hosts in questions and encourage them to not use the hosts.

2. when there are hosts with issues in the cluster a warning message is shown alerting the user of the number of issues present in the cluster. The user can click on the link to see details about the issues as well as a list of hosts with that issue.

3. When the link is clicked a dialog is presented to the user giving details on the issues. With each issue there is a list of hosts that are affected. I some cases there will be options on how to resolve the issue while in other cases we know there is no resolution such as AMD vs Intel processor incompatibility. If there are possible resolutions we should be showing the user a link to things they can try. If there is no resolution then we need to show the user details on what is wrong.

CLUSTER CONFIGURATION

This application is a continuation of U.S. Pat. No. 8,799,418 filed Jan. 13, 2010, which is hereby incorporated by reference herein in its entirety.

RELATED APPLICATION(S)

The present application is related to U.S. application Ser. No. 12/686,753 filed on Jan. 13, 2010.

BACKGROUND

Description of the Related Art

Today's enterprises demand ever-increasing scalability, high availability, and improved performance of their enterprise applications. This generates a need for designing a supportive infrastructure so as to provide maximum performance, scalability and availability of servers for running applications. Server cluster configuration is one efficient way of providing such an infrastructure. Clustering servers increases availability of a system by ensuring that if and when one server becomes unavailable due to either scheduled downtime or failure, other servers can assume the workload and ensure that the applications running on the servers are available to users. Clustering also enhances scalability by supporting more users at the current level of performance and by improving application performance for the current users.

Recent advancement in virtualization has provided even more scalability across multiple platforms. In virtualization, almost every entity uses some level of indirection to simplify computing and resource management. For instance, in a virtual environment each server host is configured to manage a plurality of client virtual machines with each virtual machine being an abstraction of a physical host and distributed virtual switches are abstraction of networks, etc. Virtual machines are fundamental building blocks of a virtual infrastructure and represent hardware resources of a computer while the virtual infrastructure (VI) represents interconnected hardware resources of an organization including computers, network devices and storages.

Clustering concept has been adapted within the VI to provide greater scalability and enhanced performance to an enterprise. In a cluster a group of server hosts (or host) are pooled together to share resources in managing the plurality of virtual machines (VMs). When a host is added to a cluster, the host's resources become part of the cluster's resources. In addition, when a cluster is created, one can choose to enable it for advanced cluster features. Virtualization and clustering allows a computing system to perform the job of multiple computing systems by abstracting computer resources such as hardware, and sharing these resources across multiple environments. This includes hosting multiple operating systems and multiple applications that are available locally or at remote locations. Further, a virtual infrastructure built with clustering enables more efficient utilization and leveraging of hardware, high availability of computer resources, better resource management, increased security and improved disaster recovery process.

However, the current infrastructure building tools to configure a cluster are not user friendly and are problematic for a variety of reasons. For one, the tools are not intuitive for a novice or average users to perform the VI build. Instead, only highly skilled and knowledgeable users to perform the build. This is especially the case when the cluster has to be set up with advanced features, such as live migration, high availability, fault tolerance, distributed resource scheduling, etc. Further, these tools do not provide an easy way for identifying available hosts that can be used to form a cluster and for determining which of these hosts are most compatible with one or more of the advanced features. Few users understand storage compatibility and connectivity criteria so as to select best-shared storage options for configuring the cluster. Furthermore, few users have the expertise to navigate through the complexity of configuring multiple, interdependent communication networks, such as management network/service console, virtual machine (VM) network, live migration enabled network, etc., in a cluster. As a result, most of the users do not know if hosts in the cluster are on shared storage or how to use shared storage, what types of network are available, etc. Further, users are not aware of what features the hosts have or whether the hosts even include advanced features.

To further complicate the cluster configuration, different settings must be made in different user interface applications or in different parts of an interface application with no obvious link between them. As applications become more complex to accommodate more robust products, it gets harder to determine the right settings to take advantage of the range of products. Some of the experienced users who are capable of configuring such clusters generally do not have the foresight and technical skill to document key details of a final cluster configuration or the intricacies of configuring and customizing the cluster. As a result, even when the settings are configured, when an average user navigates to the required interface, the user must know all the correct details, the types of issues that can arise, the range of possible settings, and how to navigate through various issues in order to take full advantage of all the advanced features. For a novice or an average user with limited knowledge on the features, virtual networking and/or storage, this process is time consuming and requires a great deal of detective work to navigate and configure across different areas of a virtual community as the system is not intuitive enough to let the users know if the selected setting for the configuration will actually work or provide conflict. Even for users who have some understanding of networking in the real-world, for instance, virtual networking may pose a challenge as elements may have been moved around.

SUMMARY

Embodiments of the present invention provide computer-implemented methods, systems and apparatus for configuring a cluster using a plurality of hosts. A set of features defining requirements that hosts must conform to for forming a cluster, is identified. A plurality of hosts is identified for forming the cluster. A compatibility analysis is executed to ensure that the capabilities available at the hosts are compatible with the features requirements for forming the cluster. A set of suggested adjustments are presented to hosts that are not compatible so as to enable the particular hosts to become compatible with the requirements. Configuration template is constructed to define the cluster settings required for the hosts. The hosts that are most compatible are used in forming the cluster and the cluster settings from the configuration template are used in configuring the hosts. The resulting cluster provides optimal selection of computing resources, computer capabilities, storage, and network connectivity for a cluster of server hosts so as to enable usage of advanced cluster features.

It should be appreciated that the present invention can be implemented in numerous ways, such as a process, an apparatus, a system, a device or a method on a computer readable medium. Several inventive embodiments of the present invention are described below.

In one embodiment, a method for constructing a cluster from a plurality of hosts is disclosed. Each host is configured to support one or more virtual machines. The method includes identifying a plurality of features for forming the cluster. The features define requirements that must be satisfied by hosts to be part of the cluster. Hosts are identified to be part of the cluster. A compatibility analysis is executed for each of the identified hosts. A plurality of suggested adjustments are presented to particular hosts in order for the particular hosts to be compatible with the requirements. A configuration template is constructed for the hosts in the cluster that are compatible with the requirements of the features. The compatible hosts are selected and configured for the cluster using the configuration template.

In another embodiment, a computer implemented method for constructing a cluster from a plurality of hosts is disclosed. Each host is designed to support one or more virtual machines. In this method, a plurality of hosts is identified to be part of the cluster. Compatibility analysis is executed for each of the identified hosts where one or more features are identified whose requirements are satisfied by the identified hosts. A plurality of suggested adjustments are presented to particular hosts to enable the particular hosts to be compatible with the requirements of the one or more identified features. A configuration template is constructed for the hosts that are compatible with the requirements of the one or more identified features. The compatible hosts are configured for the cluster using the configuration template.

In another embodiment, a computer implemented method for constructing a cluster from a plurality of hosts is disclosed. In this method, a set of features for forming the cluster is determined. Each of the features defines default requirements that must be satisfied by the hosts to be part of the cluster. The default requirements of the plurality of features are presented along with a plurality of suggested adjustments to each of the default requirements. A compatibility analysis is executed to identify hosts that meet the requirements for enabling one or more of the plurality of features. The compatibility analysis re-calculates compatibility of hosts and provides a ranking of each of the identified hosts such that the higher ranked hosts are more compatible with the requirements for enabling the features. A configuration template is constructed for the hosts in the cluster that are compatible with the requirement. Based on the compatibility analysis, a set of hosts that are most compatible with the selected features is identified and configured with configuration settings defined in the configuration template for the cluster.

In yet another alternate embodiment, a system for configuring a cluster using a plurality of hosts is disclosed. The system includes a cluster management server having a cluster configuration software and cluster configuration database. The cluster configuration software within the cluster management server is configured to interact with a plurality of hosts to form the cluster and to access the cluster configuration database to obtain information about the plurality of hosts. The cluster configuration software includes a compatibility module that interacts with the cluster configuration database to retrieve a Host list and a Features list. The Host list provides information on all hosts interacting with and managed by the cluster management server including a list of individual host's resources defining the host's capabilities. The Features list contains all licensed features available for each host including list of requirements for each feature. The compatibility module is configured to execute compatibility analysis for each host. The compatibility module is also configured to present a plurality of suggested amendments to particular hosts to enable the particular hosts to be compatible with the requirements of the features for the cluster and construct a configuration template for the hosts that are compatible with the requirements of the features. The cluster management server is configured to apply the configuration settings defined in the configuration template to each of the compatible hosts of the cluster. The compatibility module may interact with additional modules to ensure that the host match the requirements of the cluster and to provide options to override one or more of the requirements of one or more features in order to form compatible hosts cluster.

BRIEF DESCRIPTION OF THE DRAWINGS

FIGS. 4A-4F illustrate snapshots of a user interface depicting proposed configuration options available for automatic or guided configuration setup during the cluster configuration of available hosts and features, in one embodiment of the invention.

FIGS. 6A-6I illustrate snapshots of a user interface used in guiding a user to select hosts and customize the cluster based on the selected hosts, in one embodiment of the invention.

FIGS. 8A-8C illustrate snapshots of user interface during Network configuration, in one embodiment of the invention.

DETAILED DESCRIPTION

Broadly speaking, the embodiments of the present invention provide methods, apparatuses and computer implemented systems for configuring a cluster using a plurality of hosts that support multiple virtual machines. A cluster configuration software available at a cluster configuration server guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of advanced features such as live migration, high availability, fault tolerance, distributed resource scheduling, etc. Further, the software enables fine-tuning and customization of hosts by allowing addition, removal and customization of one or more hosts and one or more features so as to make hosts more compatible with the selected features and with other hosts in the cluster. The user does not have to be an expert in the virtualization, features or resources, such as storage or network connectivity, to take advantage of the advanced features. Additional benefits can be realized based on the following detailed description.

With the above overview in mind, the following description sets forth numerous specific details in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

Figure 1:
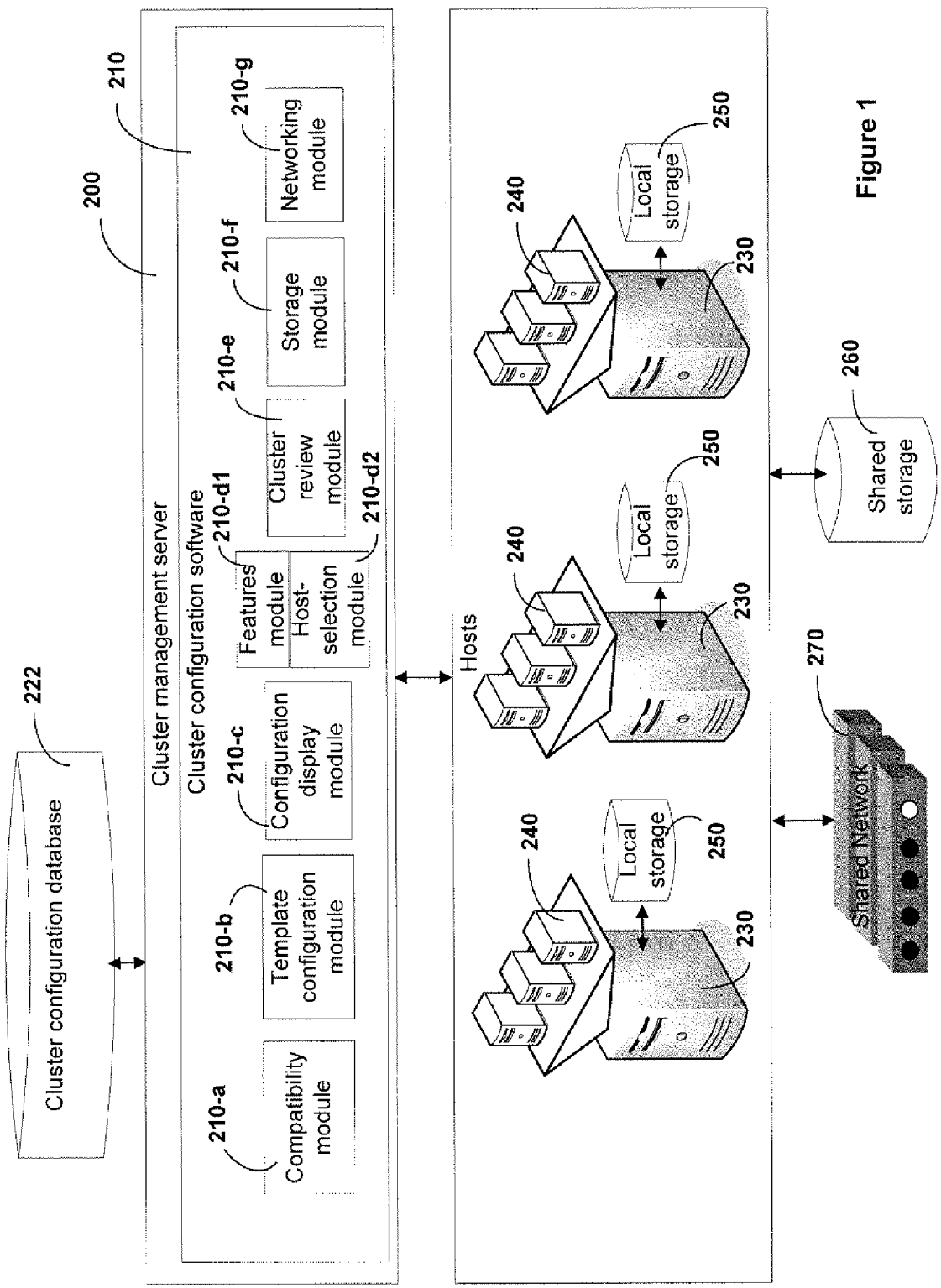
FIG. 1 illustrates an overview of a cluster configuration system that is used to form a cluster with a plurality of hosts, in accordance with one embodiment of the present invention.

FIG. 1 illustrates an exemplary system used in constructing a cluster from a plurality of hosts, in one embodiment of the invention. The system includes a cluster configuration server that can be accessed by a client (not shown) during cluster configuration. The cluster management server 200 is configured to run a cluster configuration software 210 upon request from the client. The cluster configuration software 210 runs using computing resources of the cluster management server 200. The cluster management server 200 is configured to access a cluster configuration database 220. In one embodiment, the cluster configuration database 220 includes a Host list with data related to a plurality of hosts 230 including information associated with hosts, such as host capabilities. For instance, the host data may include list of hosts 230 accessed and managed by the cluster management server 200, and for each host 230, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the Host list is maintained on a server that manages the entire virtual environment and is made available to the cluster management server 200. In addition to the data related to hosts 230, the cluster configuration database 220 includes Features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example and without limitation, host name, networking and storage requirements. Information associated with features and hosts are obtained during installation procedure of respective components prior to receiving a request for forming a cluster.

Each host is associated with a local storage 250 and is configured to support the corresponding virtual machines 240 running on the host. Thus, the host data may also include details of virtual machines 240 that are configured to be accessed and managed by each of the hosts 230. The cluster management server 200 is also configured to access one or more shared storage 260 and one or more shared network 270.

The cluster configuration software 210 includes one or more modules to identify hosts and features and manage host-feature compatibility during cluster configuration. The configuration software 210 includes a compatibility module 210-a that retrieves a Host list and a Features list from the configuration database 220 when a request for cluster construction is received from a client (not shown). The compatibility module 210-a checks for host-feature compatibility by executing a compatibility analysis which matches the feature requirements in the Features list with the hosts capabilities from the Host list and determines if sufficient compatibility exists for the hosts in the Host list with the advanced features in the Features list to enable a cluster to be configured that can utilize the advanced features. Some of the compatibilities that may be matched include hardware, software and licenses. It should be noted that the aforementioned list of compatibilities are exemplary and should not be construed to be limiting. For instance, for a particular advanced feature, such as fault tolerance, the compatibility module checks whether the hosts provide a compatible processor family, host operating system, Hardware Virtualization enabled in the BIOS, and so forth, and whether appropriate licenses have been obtained for operation of the same. Additionally, the compatibility module checks to determine if networking and storage requirements for each host in the cluster configuration database 220 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts have the required speed connection and access to the right subnet to take advantage of the selected features. The networking and storage requirements are captured in the configuration database 220 during installation of networking and storage devices and are used for checking compatibility.

The compatibility module 210-a identifies a set of hosts accessible to the management server 200 that either match the requirements of the features or provide the best match and constructs a configuration template that defines the cluster configuration settings or profile that each host needs to conform in the configuration database 220. The configuration analysis provides a ranking for each of the identified hosts for the cluster. The analysis also presents a plurality of suggested adjustments to particular hosts so as to make the particular hosts more compatible with the requirements. The compatibility module 210-a selects hosts that best match the features for the cluster. The cluster management server 200 uses the configuration settings in the configuration template to configure each of the hosts for the cluster. The configured cluster allows usage of the advanced features during operation and includes hosts that are most compatible with each other and with the selected advanced features.

During the matching process, the compatibility module 210-*a* also determines if there are any compatibility issues and/or licensing issues amongst hosts. When any such issues are identified, the compatibility module will try to resolve the issues with the suggested adjustments. The suggested adjustments may include guided tutorials to help in resolving any issues at the hosts or to make particular non-compatible hosts more compatible. In one embodiment, the tutorials are stored in the configuration database and retrieved during compatibility analysis. During cluster construction, the tutorials provide information associated with each issue including steps to be taken to resolve the issue. As and when the issues are resolved, the resolutions are recorded in the configuration template stored in the configuration database so that they can be applied to the hosts during cluster configuration.

In addition to the compatibility module 210-*a*, the configuration software 210 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 210-*b* may be used to construct a configuration template to which each host in a cluster must conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 220.

A configuration display module 210-*c* may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 210-*d*1 may be used for mining features for cluster construction. The features module 210-*d*1 is configured to provide an interface to enable addition, deletion, and/or customization of one or more features for the cluster. The changes to the features are updated to the Features list in the configuration database 220. A host-selection module 210-*d*2 may be used for mining hosts for cluster configuration. The host-selection module 210-*d*2 is configured to provide an interface to enable addition, deletion, and/or customization of one or more hosts. The host-selection module 210-*d*2 is further configured to compare all the available hosts against the feature requirements, rank the hosts based on the level of matching and return the ranked list along with suggested adjustments to a cluster review module 210-*e* for onward transmission to the client for rendering.

A cluster review module 210-*e* may be used to present the user with a proposed configuration returned by the host-selection module 210-*d*2 for approval or modification. The configuration can be fine-tuned through modifications in appropriate modules during guided configuration set-up which are captured and updated to the Host list in either the configuration database 220 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 210-*b* provides a tool to analyze various combinations of hosts before selecting the best hosts for the cluster.

A storage module 210-*f* enables selection of storage requirements for the cluster based on the host connectivity and provides an interface for setting up the storage requirements. Shared storage is required in order to take advantage of the advanced features. As a result, it is essential to determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 220 which is, in turn, based on compatibility with prior settings of hosts, networks and advanced features and enables editing of a portion of the default storage settings to take advantage of the advanced features. In one embodiment, if a required storage is available to only a selected number of hosts in the cluster, the storage module will provide necessary user alerts in a user interface with required tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 220 as primary storage for the cluster during cluster configuration.

A networking module 210-*g* enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

Figure 2A:
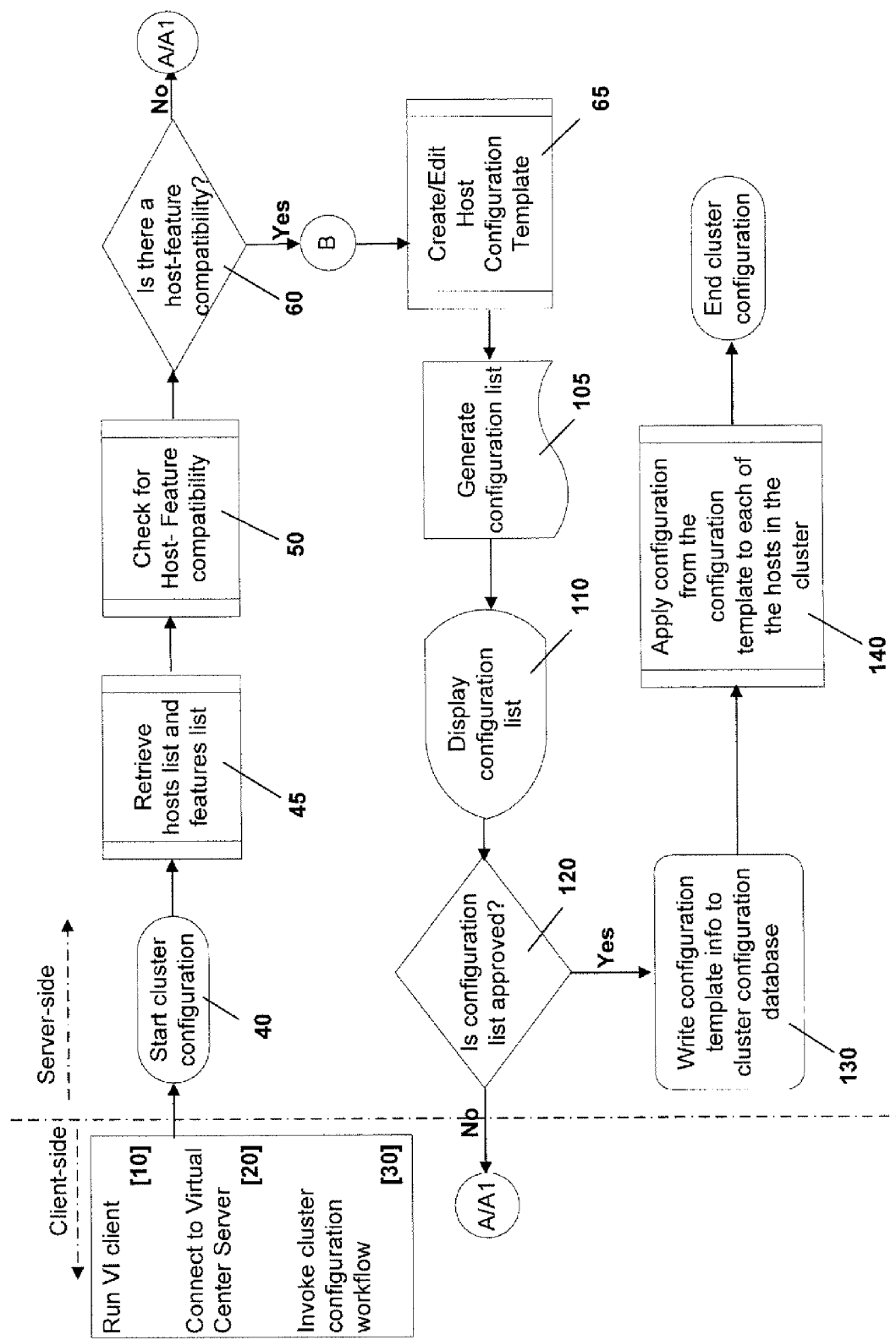
FIG. 2A illustrates workflow of operations used to match available features with available hosts during guided cluster configuration, in accordance with one embodiment of the present invention.

With the above overview of the various components of a system used in the cluster configuration, specific details of how each component is used in the process of constructing a cluster using plurality of hosts will now be described with reference to FIG. 2A. FIG. 2A describes a cluster construction workflow, in accordance with one embodiment of the invention. Referring to FIG. 2A, the workflow process begins with a request for constructing a cluster from a plurality of hosts which support one or more virtual machines. The request is received from a client, such as a virtual infrastructure (VI) client. The process of receiving a request for configuring a cluster could include additional processes such as starting a VI client, as illustrated in operation 10. The VI client is started by a system administrator or by any other user interested in setting up a cluster. The client then connects to a cluster management server, such as a virtual center (VC) server, running cluster configuration software as described above, as illustrated in operation 20. The client then invokes the cluster configuration software on the server, as illustrated in operation 30. The cluster management is performed by the VC server. It should be noted that operations 10-30 are initiated at the VI client as and when a cluster needs to be constructed.

The invoking of the cluster configuration software from the client triggers the cluster configuration workflow process at the cluster management server by initiating a compatibility module, as illustrated in operation 40. Upon receiving the request for constructing a cluster, the compatibility module queries a configuration database available to the management server and retrieves a Host list of hosts that are accessible and managed by the management server and a Features list of features for forming the cluster. The Host list contains all hosts managed by the management server and a list of capabilities of each host. The list of capabilities of each host is obtained during installation of each host. The Features list contains all licensed features that have at least a minimum number of host licenses for each licensed feature, a list of requirements, such as host, networking and storage requirements. The Features list includes, but is not limited to, live migration, high availability, fault tolerance, distributed resource scheduling. Information in the Features list and Host list are obtained from an initial installation procedure before cluster configuration and through dynamic updates based on hosts and features added, updated or deleted over time and based on number of licenses available and number of licenses in use.

The compatibility module then checks for the host-feature compatibility by executing a compatibility analysis for each of the hosts. The compatibility analysis compares the capabilities of the hosts in the Host list with the features requirements in the Features list, as illustrated in operation 50. Some of the host capability data checked during host-feature compatibility analysis include host operating system and version, host hardware configuration, Basic Input/Output System (BIOS) Feature list and whether power management is enabled in the BIOS, host computer processor family (for example, Intel, AMD, and so forth), number of processors per host, number of cores available per processor, speed of execution per processor, amount of internal RAM per host, shared storage available to the host, type of shared storage, number of paths to shared storage, number of hosts sharing the shared storage, amount of shared storage per host, type of storage adapter, amount of local storage per host, number and speed of network interface devices (NICs) per host. The above list of host capability data verified during compatibility analysis is exemplary and should not be construed as limiting.

Some of the features related data checked during compatibility analysis include determining number of licenses to operate an advanced feature, such as live migration/distributed resource scheduling, number and name of hosts with one or more Gigabit (GB) Network Interface Card/Controller (NIC), list of hosts on same subnet, list of hosts that share same storage, list of hosts in the same processor family, and list of hosts compatible with Enhanced live migration (for example VMware Enhanced VMotion™) compatibility. The above list of feature related compatibility data is exemplary and should not be construed as limiting.

Based on the host-feature compatibility analysis, the compatibility module determines if there is sufficient host-feature compatibility for hosts included on the Host list with the features included on the Features list to enable a cluster to be constructed that can enable the features, as illustrated in operation 60. Thus, for instance, for a particular feature, such as Fault Tolerance, the compatibility module checks whether the hosts provide hardware, software and license compatibility by determining if the hosts are from a compatible processor family, the hosts operating system, BIOS features enabled, and so forth, and whether there are sufficient licenses for operation of features for each host. The compatibility module also checks to determine whether networking and storage resources in the cluster configuration database for each host is compatible with the feature requirements. Based on the compatibility analysis, the compatibility module generates a ranking of each of the hosts such that the highest ranked hosts are more compatible with the requirements for enabling the features. Using the ranking, the compatibility module assembles a proposed cluster of hosts for cluster construction. In one embodiment, the assembling of hosts for the proposed cluster construction is based on one or more pre-defined rules. The pre-defined rules can be based on the hosts capabilities, feature requirements or both the hosts capabilities and feature requirements. For example, one of the pre-defined rules could be to identify and select all hosts that are compatible with the requirements of the selected features. Another pre-defined rule could be to select a given feature and choosing the largest number of hosts determined by the number of licenses for the given feature based on the compatibility analysis. Yet another rule could be to select features and choosing all hosts whose capabilities satisfy the requirements of the selected features. Another rule could be to obtain compatibility criteria from a user and selecting all features and hosts that meet those criteria. Thus, based on the pre-defined rule, the largest number of hosts that are compatible with the features are selected for forming the cluster.

Based on the compatibility analysis, a host configuration template is constructed to include the configuration information from the proposed cluster configuration of the hosts, as illustrated in operation 65. A list of configuration settings is defined from the host configuration template associated with the proposed cluster configuration of the hosts, as illustrated in operation 105. Each of the hosts that are compatible will have to conform to this list of cluster configuration settings. The cluster configuration settings may be created by the compatibility module or a template configuration module that is distinct from the compatibility module. The configuration settings include network settings, such as number of NICs, bandwidth for each NIC, etc., storage settings and hardware configuration profile, such as processor type, etc. Along with the configuration settings, the compatibility module presents a plurality of suggested adjustments to particular hosts to enable the particular hosts to become compatible with the requirements. The suggested adjustment may include guided tutorials providing information about the incompatible hosts, and steps to be taken for making the hosts compatible as part of customizing the cluster. The cluster configuration settings from the configuration template are returned for rendering on a user interface associated with the client, as illustrated in operation 110.

Figure 3:
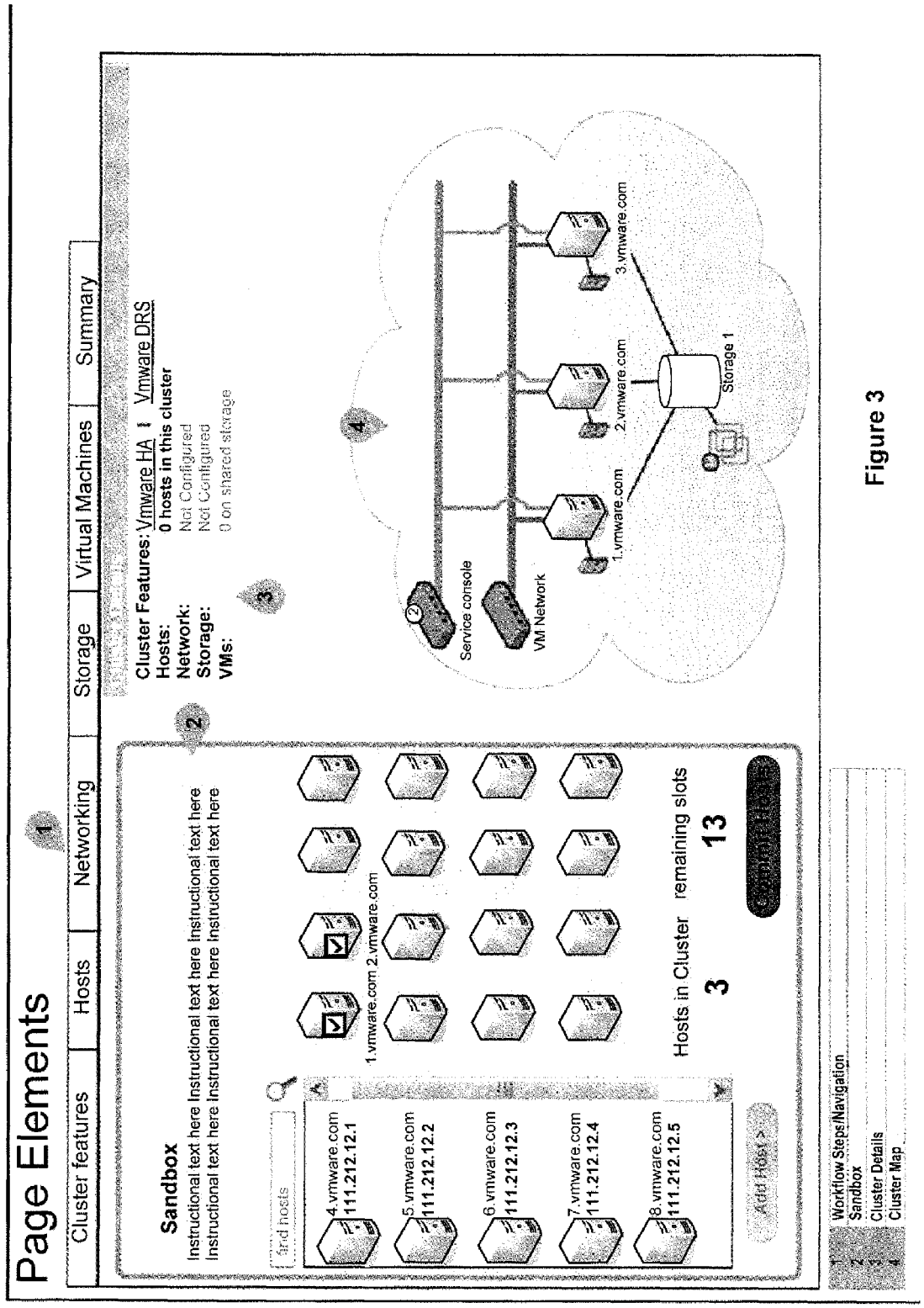
FIG. 3 illustrates a sample user interface used during cluster configuration, in one embodiment of the invention.

In one embodiment, the user interface is provided as a page. The page is divided into a plurality of sections or page elements with each section providing additional details or tools for confirming or customizing the current cluster. FIG. 3 illustrates a sample page user interface used in cluster configuration, in one embodiment of the invention. Accordingly, a Workflow Steps/Navigation section, illustrated as bubble 1, shows links that allow a user to navigate to different configuration components, such as Cluster features, hosts, networking, storage, virtual machines, summary. A Sandbox section, illustrated as bubble 2, provides a work area with related tutorial links and selectable configuration items such as host computers (hosts), memory, networks and custom features. The Sandbox is used extensively for configuration activity where "what-if" scenarios are tested. A Cluster Details section provides status of component configuration, including a list of configurable items, and the logical structure after the configuration is completed. A Cluster Map section provides graphical representation of the cluster configuration by identifying the various components of the cluster, such as host computers, data and storage networks and virtual machines, and their connectivity.

Referring back to FIG. 2A, the configuration settings from a configuration template is rendered at the user interface on the client in response to the request for cluster configuration. If the rendered configuration settings are acceptable, as illustrated in decision point 120, the information in the configuration template is committed into the configuration database for the cluster, as illustrated by operation 130, and used by the management server for configuring the hosts for the cluster. The selected hosts are compatible with the features and with each other. Configuration of hosts may include transmitting storage and network settings from the host configuration template to each of the hosts in the cluster, which is then applied to the hosts, as illustrated in operation 140. The application of the configuration settings including network settings to the hosts may be done through a software module available at the hosts, in one embodiment of the invention. In one embodiment, a final report providing an overview of the hosts and the cluster configuration features may be generated and rendered at the client after applying the settings from the configuration template. The cluster configuration workflow concludes after successful cluster construction with the hosts.

Figure 4:
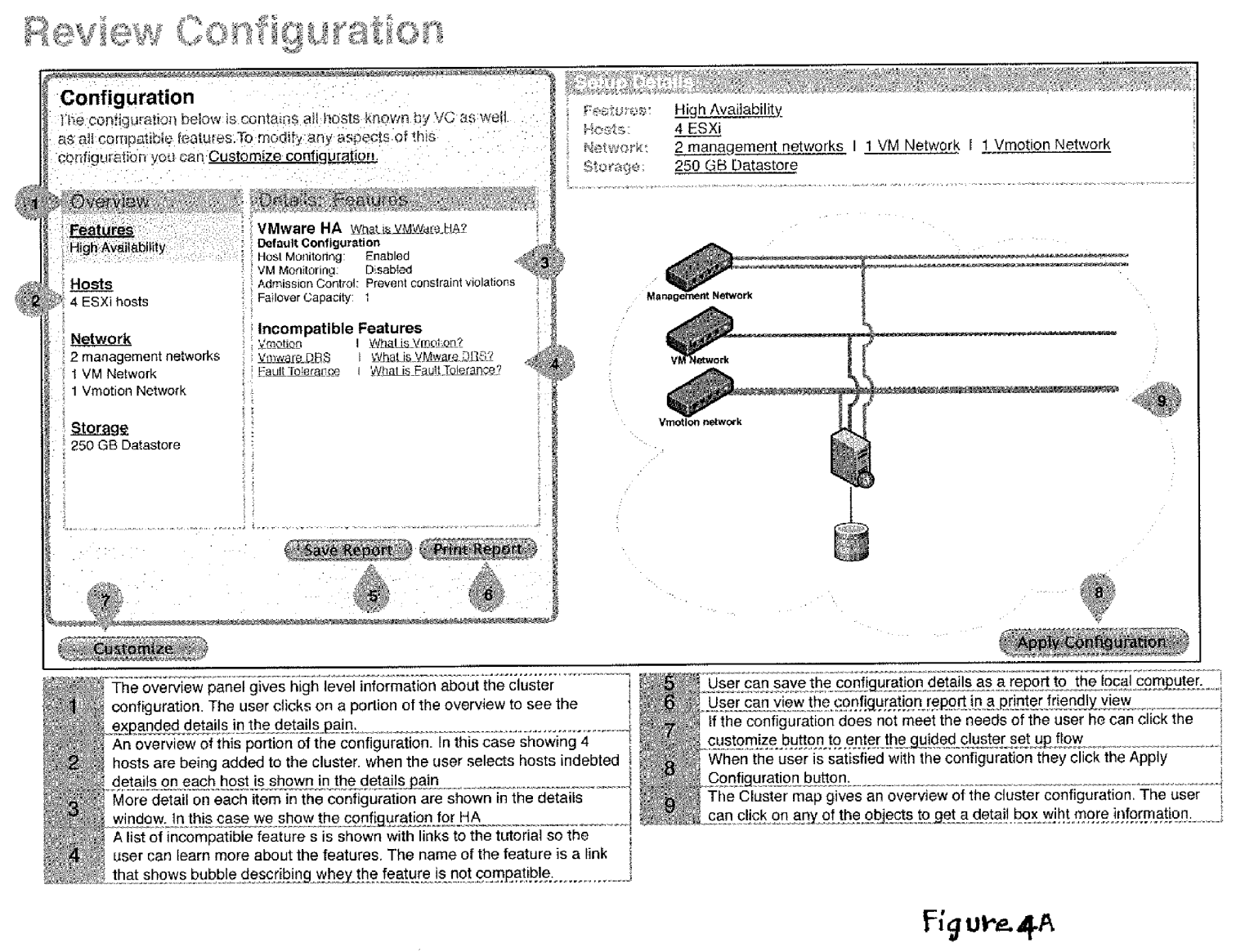
Figure 4B:
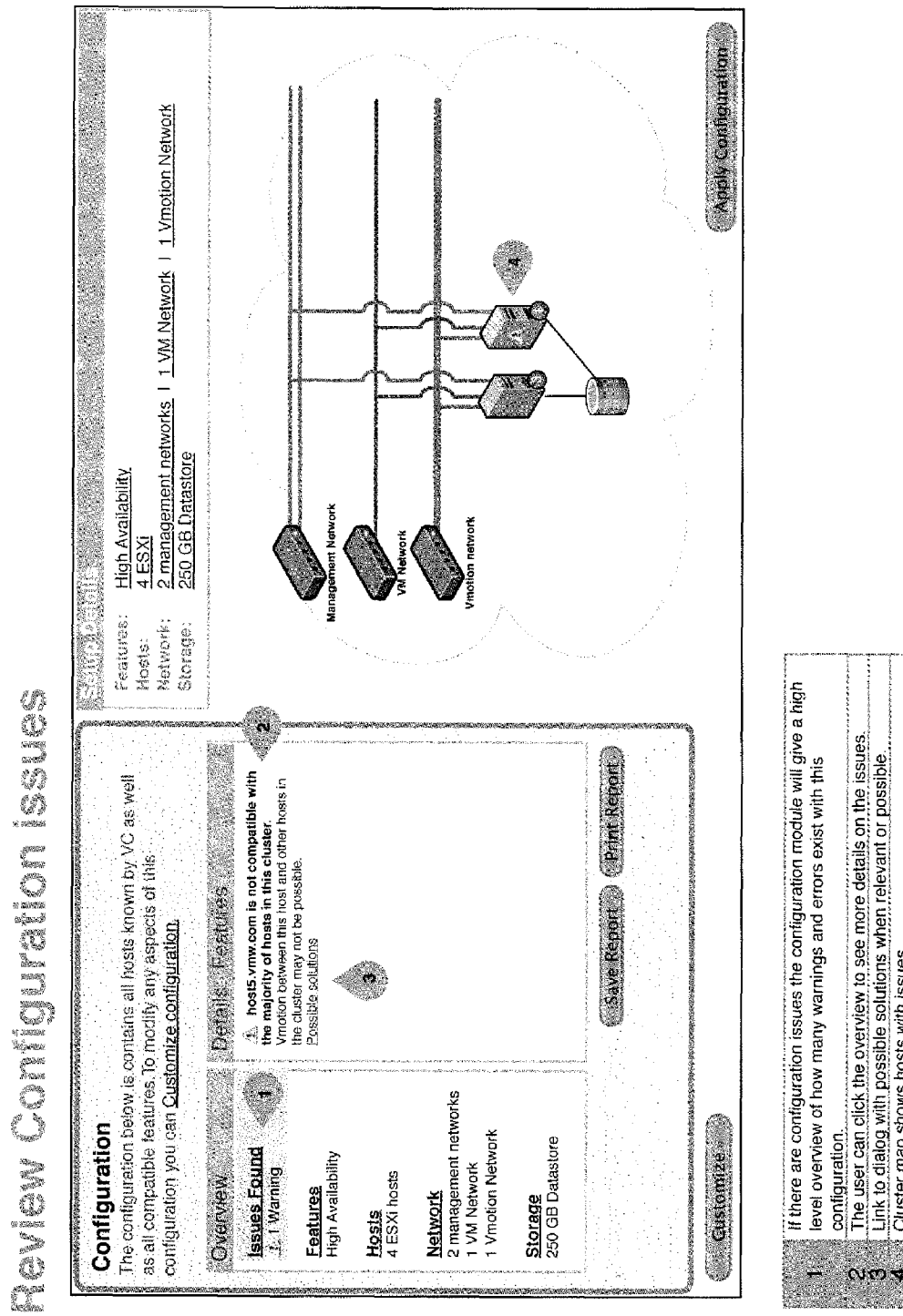
Figure 4C:
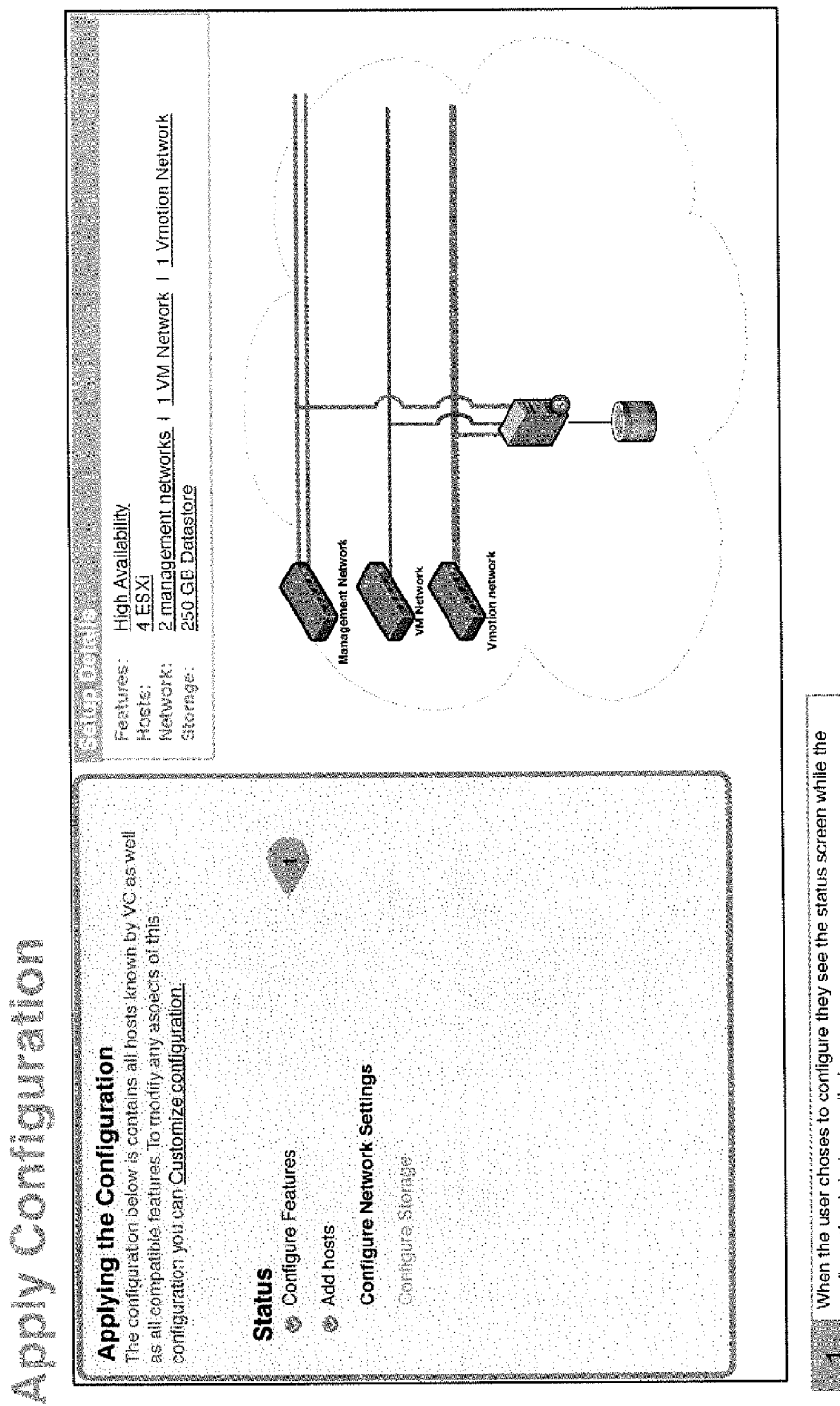
Figure 4D:
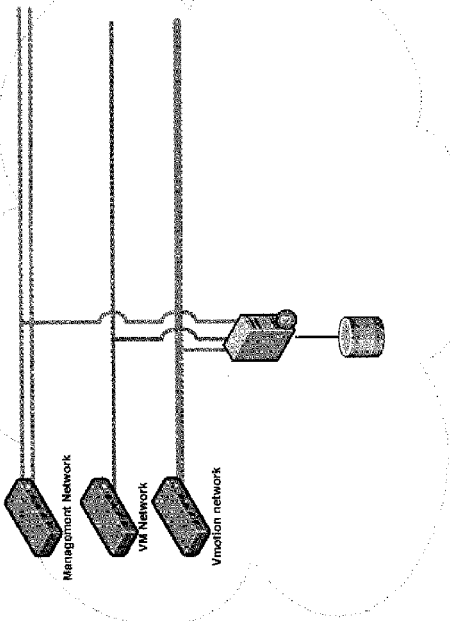
Figure 4E:
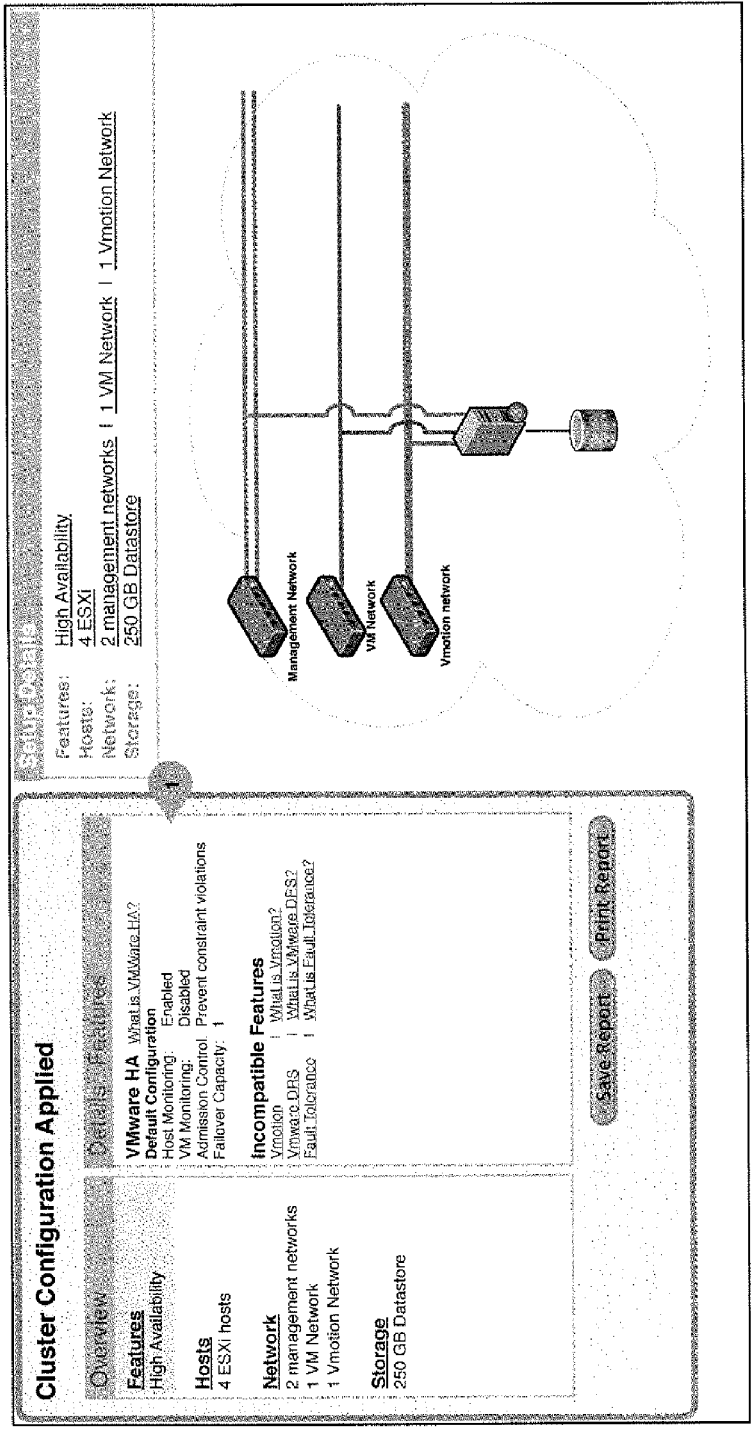
Figure 4F:
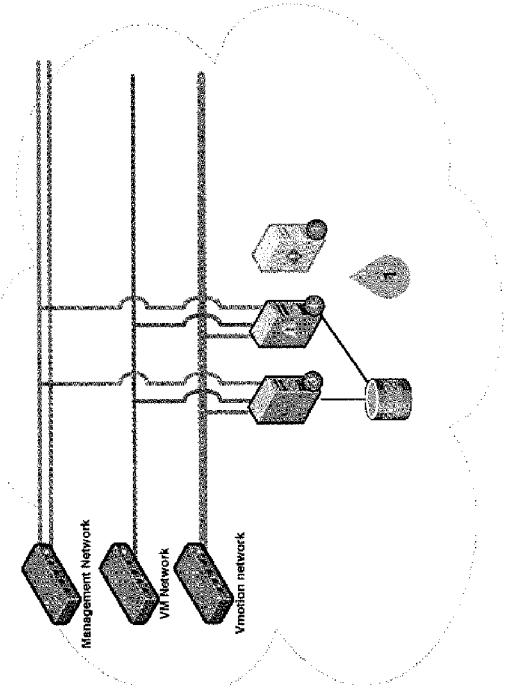

FIGS. 4A-4F illustrate a snapshot of a Sandbox section of a sample configuration user interface during configuration of the hosts for the cluster. As can be seen in FIG. 4A, a "Overview" panel shows high-level information about the cluster construction. A user can click on a portion of the overview panel, such as Features, Hosts, Network or Storage, to view the expanded details of the selected portion in a "Details" panel. For instance, as shown in FIG. 4A, the user selects Features portion to view the details of all the Features available for the cluster including incompatible hosts/features. FIG. 4B illustrates the details of issues with one or more features selected in FIG. 4A. Referring to FIG. 4A, if the rendered configuration is not acceptable, the user interface also includes a "Customize" button to customize the configuration settings. A plurality of suggested adjustments are presented along with appropriate links to guided tutorials in the details panel to guide the user in resolving any compatibility issues associated with the features/hosts rendered in the details panel. If the rendered configurations are acceptable, the user can proceed with the construction of the cluster with the rendered configuration settings. Status of the host configuration during cluster construction is illustrated in FIG. 4C. If any issues are encountered during the actual construction, suitable errors and warnings are rendered at the user interface to alert the user on the encountered issues, as illustrated in FIG. 4D. A final report of host configuration is provided after cluster has been successfully constructed, as illustrated in FIG. 4E. The final report may still include details about issues encountered during configuration which may be due to incompatibility of features or hosts selected, as illustrated in FIG. 4F. The issues can be resolved by fine-tuning the requirements of the features or the hosts using the plurality of suggested adjustments and the guided tutorials that provide detailed information on how to go about resolving the issues.

The compatibility module provides a graphical user interface (GUI) to render the various cluster and configuration settings including the configuration components of the cluster during cluster construction. The configuration components are configuration elements that are used for interaction during cluster construction. Some of the configuration components used may include features, requirements of features, hosts, storage, network, settings, configurations, templates, etc. The aforementioned list of configuration components is only exemplary and should not be considered restrictive. The GUI is used to capture the interactivity amongst the various components and update the configuration settings in the configuration template so that the configuration template reflects the latest configuration information for the cluster. The GUI provides a simple visual representation of the underlying complex interrelations of the various components that are involved in the cluster construction.

Figure 9:
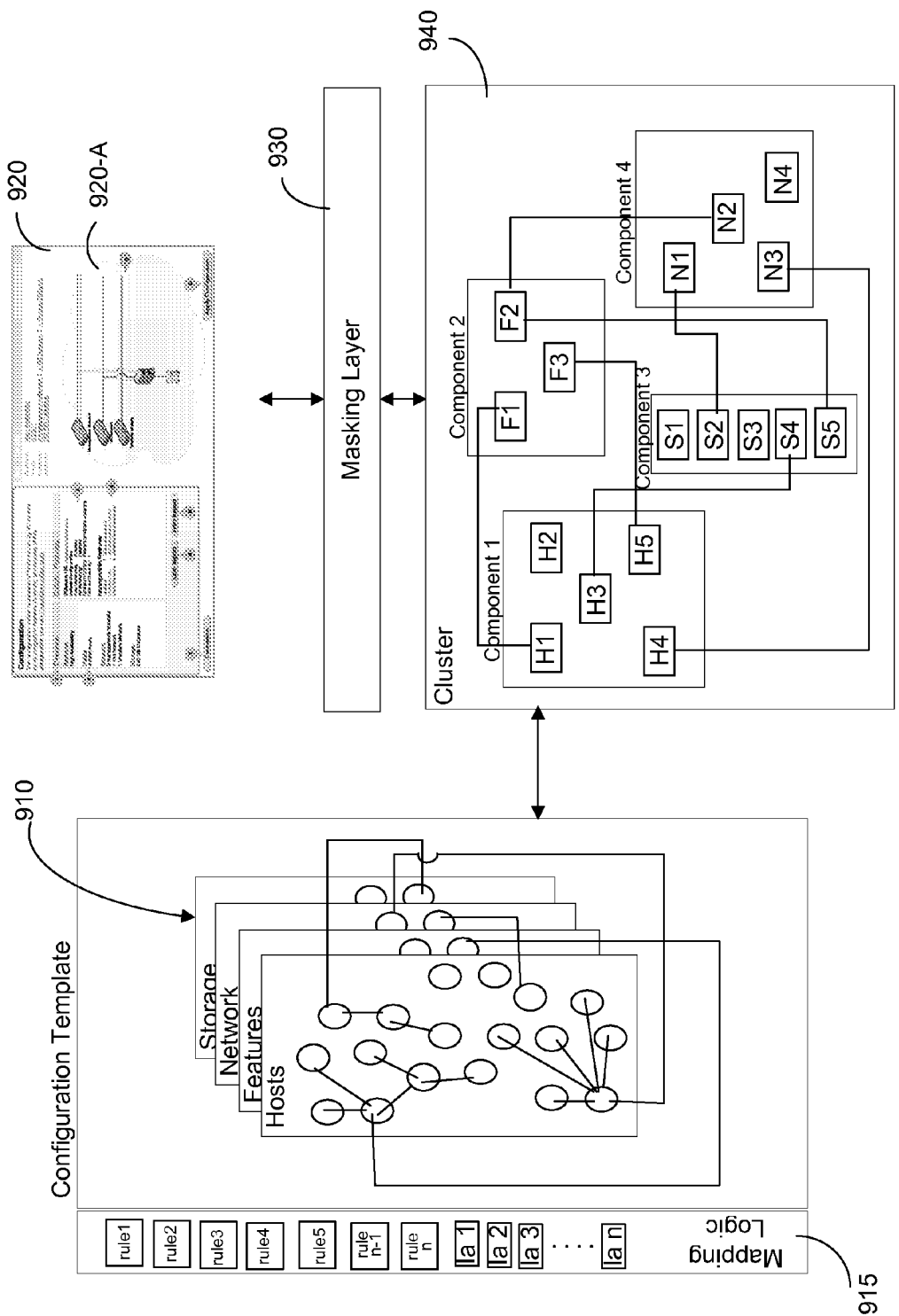
FIG. 9 illustrates an overview of various components and their underlying interrelationship in the cluster, in one embodiment of the invention.

FIG. 9 illustrates an overview of various exemplary components and their underlying example interrelationship in the cluster. To begin with, when components, such as hosts, network devices, storage components, etc., are installed, the information associated with these components, such as metadata and configuration information, is captured in a configuration database. A mapping logic 915 uses the metadata and configuration information of the various components to map the components. A set of mapping and interaction rules (rules1, rules2, rules3, . . . Ia 1, Ia 2, Ia 3, etc.) within the mapping logic defines the limits and bounds for grouping and for defining interaction of the various components. The mapping logic extracts the requirements from the metadata and configuration information of some of the components, such as features, and converts them into mapping and interaction rules. These mapping and interaction rules are then used to modify and mold other components, such as hosts, storage, network, etc., so as to make them comply with the requirements for the cluster. For instance, a feature, such as Distributed Resource Scheduling (DRS), may require at least 1 gigahertz (GHz) Ethernet connectivity in order avail this feature. Using this requirement, the mapping logic may group hosts according to their networking capability so that the hosts with at least 1 GHz network capability are all grouped together. In another instance, geographic requirements may be used to group the hosts together.

When a cluster construction request is received, the compatibility module uses the mapping logic for selecting and presenting the appropriate components for the cluster at a graphical user interface (GUI) 920. The underlying cluster information includes the interconnectivity map information 940 of the various components selected for the cluster based on the mapping and interaction rules of the mapping logic. This interconnectivity map is used in generating and rendering a cluster map 920-A for the cluster at the GUI 920.

A masking layer 930 at the GUI provides an abstraction of the underlying components and their interconnection by presenting distinct icons with simple interconnects in graphical form for different components of the cluster at the GUI. These icons are used to allow easy modification the interactions, connections or associations between various components presented for a given cluster. Certain times when a selected component presented at the GUI is added, removed, changed, or modified, the modification may trigger appropriate reconfiguration of the underlying components that is masked by the masking layer 930. Thus, for instance, when a new host is added to the cluster, the masking layer triggers an addition operation. The addition operation uses the mapping and interaction rules to validate and group the new host based on the host's information and the existing mapping rules in the mapping logic. Upon validation, the new host is added to the cluster, appropriate interconnection established and the new host's information is updated to an already existing configuration template or if no configuration template exists, a new configuration template is constructed for the cluster so as to enable the other components in the cluster to interact with the new host. The configuration template reflects the current components and the interconnectivity information of the current components for the cluster. Additionally, interconnection settings of other components, such as network and storage settings, as well as, feature information, are also updated on to the configuration template to reflect the addition of the new host. The graphical form of the constructed cluster is dynamically updated to reflect the addition of the new host. Similarly, when a host is removed from the cluster, the underlying interconnections of the deleted host with the various components are removed and the configuration settings in the configuration template are updated to reflect the deletion.

As and when component settings are adjusted or changed at the GUI, the logic within the masking layer triggers appropriate operation in order to dynamically update the configuration settings so that the configuration information of the cluster reflects the current connectivity or grouping information. Any changes to component settings can be performed by any one of interactive drag, drop, select, delete, add or move operations. The aforementioned modifying operations are exemplary and should not be considered limiting. As various components are added, deleted, adjusted, changed, the many layers of cluster configuration are dynamically updated and a configuration template is constructed/updated to reflect the current settings for the cluster. Any updates to the component interconnections and configuration settings are transparent to a user performing the cluster construction. The user only sees the simple visual representation of the components and is not aware of the complex configuration/re-configuration that go on in the underlying components layer. It should be noted here that even a small change related to a host, such as upgrading a network device associated with the host, can result in many non-obvious adjustments in settings of one or many underlying components, which are made automatically in the background (i.e. these interrelated changes are masked from the user interface). Thus, for instance, if a host's NIC card is upgraded, this change can trigger adjustment to the grouping of the host from sub-GHz network compatible group to the GHz network compatible group. Along with the migration of the host from one network compatible group to another, the other interconnections related to the host, including storage interconnections also have to be adjusted accordingly. This sequence of adjustments are efficiently performed by the logic in the masking layer in the background and these adjustments are transparent the user. Thus, the configuration software provides an efficient way of configuring and re-configuring the components and their interconnections within a cluster while maintaining transparency of the complex dependency of the various components in the underlying components layers.

Figure 2B:
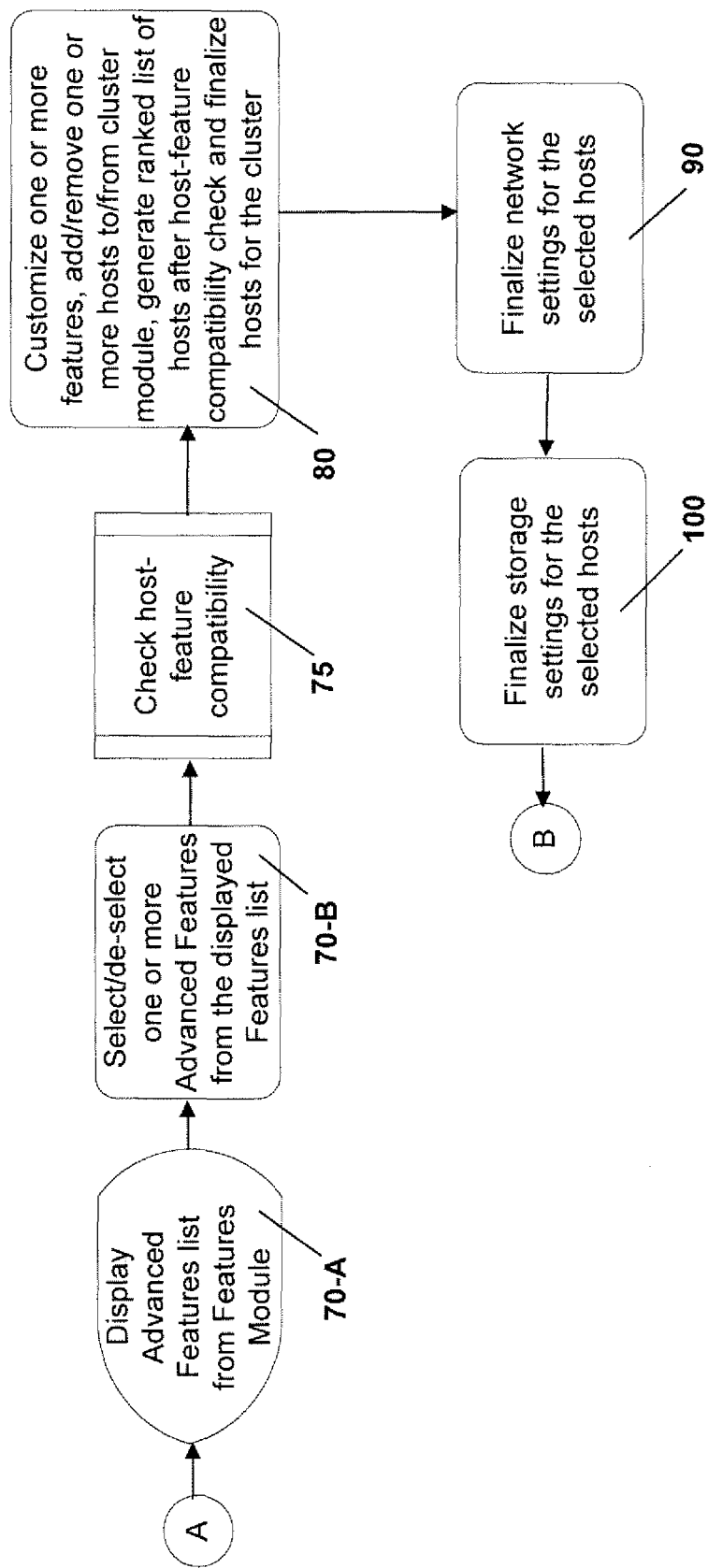
FIG. 2B illustrates an alternate workflow of operations used in selecting features and configuring the hosts based on the selected features during guided cluster configuration, in accordance with one embodiment of the present invention.

If, at operation 60, the hosts in the Host list are not compatible with the features in the Features list, then the process of selecting one or more features is performed so that host-feature compatibility can be established. FIG. 2B illustrates the workflow process of selecting features and using the selected features to determine hosts for constructing the cluster, in one embodiment of the invention. To assist in the selection of features, a features module is used. The features module may be a sub-routine within the compatibility module or may be a distinct module used in selecting the appropriate features for the cluster. The features module identifies retrieves a plurality of features from the Features list along with the default requirements available for the cluster and presents the list of the features with the default requirements to the client for rendering on a user interface for confirmation and/or selection, as illustrated in operation 70-A. Along with the list, a plurality of suggested adjustments to the default requirements may also be presented to the client so that one or more requirements of one or more features may be adjusted. In one embodiment, the features module checks to see which features include licenses for operation and includes only those features in the features list returned to the client for selection. One or more features from the rendered features list are selected for the cluster, as shown in operation 70-B. The features may be selected to adjust one or more requirements based on suggested adjustments using the guided tutorials. The selection of the features enables a user to customize the configuration of the cluster by incorporating changes to the requirements of one or more features in the Features list. Any changes to the features and/or requirements of the features are updated to the Features list/ A detailed explanation of various features requirements provided through tutorials helps in customizing the requirements for the cluster.

Figure 5A:
FIGS. 5A-5C illustrate snapshots of a user interface used in guiding a user to select features and customize the cluster based on the selected features, in one embodiment of the invention.
Figure 5B:
Figure 5C:
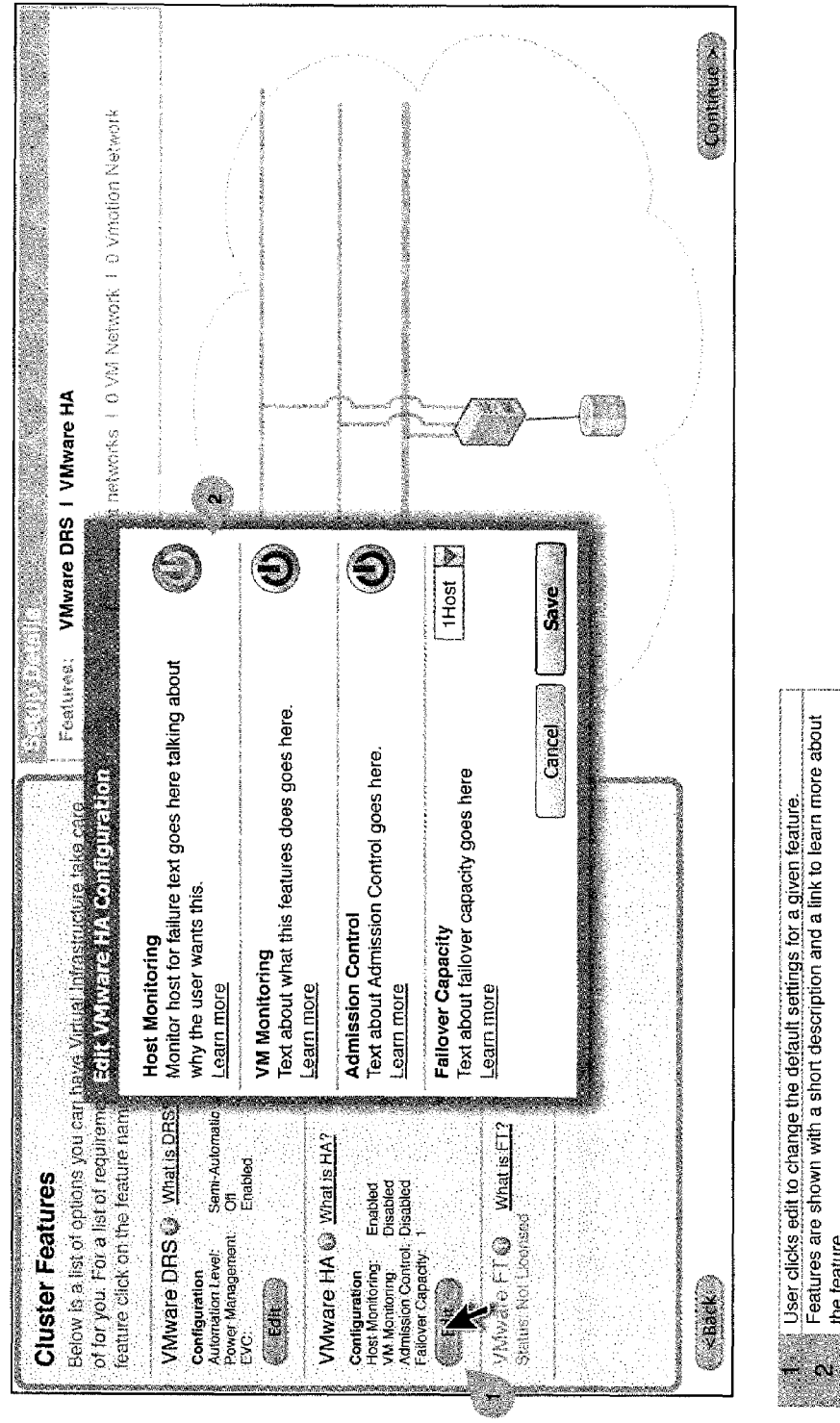

FIGS. 5A-5C illustrate a snapshot of a portion of the user interface used in customizing the features rendered at the client during features selection and/or de-selection process. As shown in FIG. 5A, when the list of hosts and the list of features from the configuration database do not pass the compatibility check during the compatibility analysis, the features module accumulates the features that are available for the cluster for which licenses are available along with corresponding default requirements that must be satisfied by the hosts during cluster construction and presents the features and default requirements to the client for selection/customization. Along with the default requirements, a plurality of suggested adjustments to the one or more default requirements of one or more features is also presented to the client. The suggested adjustments include a plurality of informational tutorials to guide through the selection of various features requirements. In one embodiment, the feature selection module may include features that are installed and available within the cluster but do not have licenses for use. In this case, these features are rendered at the client but are not enabled. Text tips are provided for these features explaining reasons for not activating the features. In one embodiment, a feature returned for rendering on the client may be disabled due to a prerequisite not being satisfied for the feature. For instance, in one embodiment, DRS may require live migration feature. So, if the cluster has appropriate licenses for DRS but not for live migration, then DRS is disabled when rendered at the client and appropriate text explaining the licensing issue with DRS and live migration features is provided in the form of an informational message so that the issue can be dealt with and resolved. The informational message is used to select/de-select and/or adjust features and requirements. The features information also provides details associated with the feature including number of licenses available for each of the features. The guided tutorial associated with each of the features includes a brief overview of how to enable the corresponding feature from the rendered list of features, procedure to follow to obtain additional licenses if needed, information on the activated features and a summary of the activated features including default configuration requirements. As shown, an activation button is used to activate/de-activate a rendered feature.

As shown in FIG. 5B, as and when a feature is selected, default requirement settings for the selected feature are rendered. An overview for each of the default requirement settings is available when needed. The interface also provides the ability to edit any of the default settings for each rendered feature and the overview of these settings help in making appropriate edits, as shown in FIG. 5C. The selection/activation of one or more features and edits to the requirement at each of the selected features at the client is captured and transmitted to the management server. The compatibility module at the management server receives the edits and updates the feature settings for the selected features for the cluster and in the Features list in the configuration database so that the updated features' settings can be applied to the hosts during cluster construction. Thus, the compatibility module provides ways to select/de-select features and to customize the configuration of the one or more features so that these changes can be incorporated into the cluster.

Continuing to refer to FIG. 2B, in operation 75, upon selection/de-selection of the one or more features, the compatibility module executes a compatibility analysis to determine hosts which match the requirements of the features in the cluster. It should be noted that as the features are selected/de-selected, the number of hosts that match the features vary accordingly. Along with the list of hosts, the compatibility module also presents a plurality of suggested adjustments to particular hosts in order to make the particular hosts more compatible with the selected features. The suggested adjustments also include guided tutorials to assist in the resolution of any compatibility issues the hosts may face for the selected features during cluster construction. In addition to the guided tutorials, the compatibility module may also provide best practice recommendations for overcoming the encountered compatibility issues. The best practice recommendation may be created during initial installation prior to cluster configuration. For example, for an advanced feature, such as High Availability, some of the issues encountered may be directed towards the hosts having processors from incompatible processor families or operating systems or BIOS types for the advanced features. Based on the type of compatibility issue, one such recommendation could be to upgrade the operating system for a particular host or hosts to overcome the operating system incompatibility and the guided tutorial could provide steps that need to be taken to upgrade the operating system. Using the recommendations and tutorial, one or more of the compatibility issues are resolved.

As and when the compatibility issues are resolved, the resolutions are captured in the host configuration template and updated to the configuration database for the cluster so that the resolution can be applied during configuration of the hosts. The list of hosts that best match the features for the cluster are finalized based on pre-defined rules, as illustrated in operation 80. As the features are selected/de-selected, the compatibility analysis dynamically ranks the hosts based on their compatibility with the selected features and with other selected hosts such that the hosts that are most compatible with the features and other hosts are ranked higher.

In addition to selection/de-selection of one or more existing features, additional features may be added to the cluster using the user interface. The additional feature along with corresponding requirements is updated to the Features list in the configuration database. As new features are added, the list of hosts for constructing the cluster may vary to reflect hosts that are most compatible with the selected features and with other hosts for the cluster. The compatibility module re-ranks the hosts taking the intersection of features and hosts so that the best set of hosts may be selected for forming the cluster based on the compatibility analysis.

In addition to selection/de-selection/addition of features, one or more hosts may be added or removed from the Host list for the cluster based on the compatibility analysis, as illustrated in operation 80. A cluster review module gathers the cluster configuration information from the compatibility module and presents the cluster configuration information to the client using an appropriate interface. A subroutine within the compatibility module interacts with the cluster review module and may provide an interface to add/remove hosts from the current cluster so that the remaining hosts are compatible with the selected features for the cluster. The process of adding or removing the hosts is carried out by the compatibility module using an initial set of hosts available to the management server for cluster configuration. Depending on the features selected/de-selected for the cluster, the initial set of hosts may be ranked and rendered according to their compatibility with the remaining features. In one embodiment, the hosts are ranked and rendered such that the most compatible hosts for the features are rendered at the top and the least compatible hosts are rendered at the bottom. In one embodiment, the ranking of the hosts may also identify the type of issue and level of incompatibility of the hosts to the selected features for the cluster. Guided tutorials and recommendations are provided to resolve any compatibility issues so as to select the most compatible hosts for forming the cluster. Once the list of hosts are finalized for the cluster, the configuration settings within the configuration template are updated and the hosts are configured with the updated configuration settings to form a most optimal cluster. The process then proceeds to finalizing the network settings and storage settings for the cluster.

Based on the host compatibility analysis, the network settings are finalized for the selected hosts in the cluster, as illustrated in operation 90. Network settings are verified by a networking subroutine within the compatibility module or by a distinct networking module within the cluster configuration software. The networking module presents a pre-defined network configuration for the hosts in the cluster using the default network settings stored on the host configuration template in the cluster configuration database. The default network settings are configured in bulk for hosts so as to ensure consistency in the configuration across all hosts in the cluster. The networking module also allows for custom configuration of network settings during customization of hosts by allowing editing of specific network settings while retaining network compatibility among all hosts in the cluster, sends alerts when there are network compatibility issues due to customization, and provides solutions to network compatibility issues and tutorials using simple descriptions for various networking options to enable selection of appropriate network settings when needed. It should be noted that most of the network settings are pre-defined during installation stage and are changed based on features and hosts selected for the cluster. Thus, if a host or feature is added or deleted, the network settings change accordingly to reflect the changes in the hosts and features. In one embodiment, the networking module is executed after checking compatibility of the hosts when network settings need to be customized. Upon successful configuration of the network settings, the network settings are updated to the configuration template for the cluster so that the network settings can be uniformly applied to all the hosts during cluster configuration. More details about configuring network settings will be discussed with reference to FIGS. 8A-8C.

In addition to the network settings, storage settings are finalized for the selected hosts in the cluster based on the host compatibility analysis, as illustrated in operation 100. Storage configuration settings are verified by a storage subroutine within the compatibility module or by a distinct storage module within the cluster configuration software. The storage module verifies that all hosts in the cluster share the same storage to allow advanced features to work properly, enables configuration of all hosts to have the same storage settings, and provides guidance to resolve storage issues when one or more hosts are unable to access a specific shared storage device. The storage module identifies the best performing storage available for the cluster, and ensures that the best performing storage is accessible by all the hosts that have been selected for the cluster. In case of storage area network (SAN) storage, the storage module verifies that the storage is connected to all hosts in the cluster so that all the hosts see the same set of logical unit numbers (LUNs) or storage devices. The storage module allows customization of storage settings by providing an interface for selecting options for shared storage for the cluster. The interface provides default settings based on the host configuration template stored in the cluster configuration database, which are in turn based on compatibility with previous settings for hosts, networks, and advanced features. The storage module provides tutorials to help pick the best storage option for the cluster. The selected storage option is used in the cluster configuration. More details about storage configuration is discussed with reference to FIG. 7.

After selecting the hosts, network settings and storage, the process returns to operation 65 as described above with reference to FIG. 2A, wherein the host configuration template is constructed (created). The host configuration template, at this time, will include the customizations associated with the features, hosts, network settings and storage settings. The configuration template provides a list of configuration settings, as illustrated in operation 105 and rendered for confirmation (operation 110). If the configuration list is approved (decision point 120), the configuration template is written to cluster configuration database (operation 130) and the configuration is applied to each of the hosts in the cluster (operation 140). If the configuration is not approved, the process returns to operation 70-A wherein features from the features list are rendered for further selection/de-selection and the process continues till the configuration is approved.

Figure 2C:
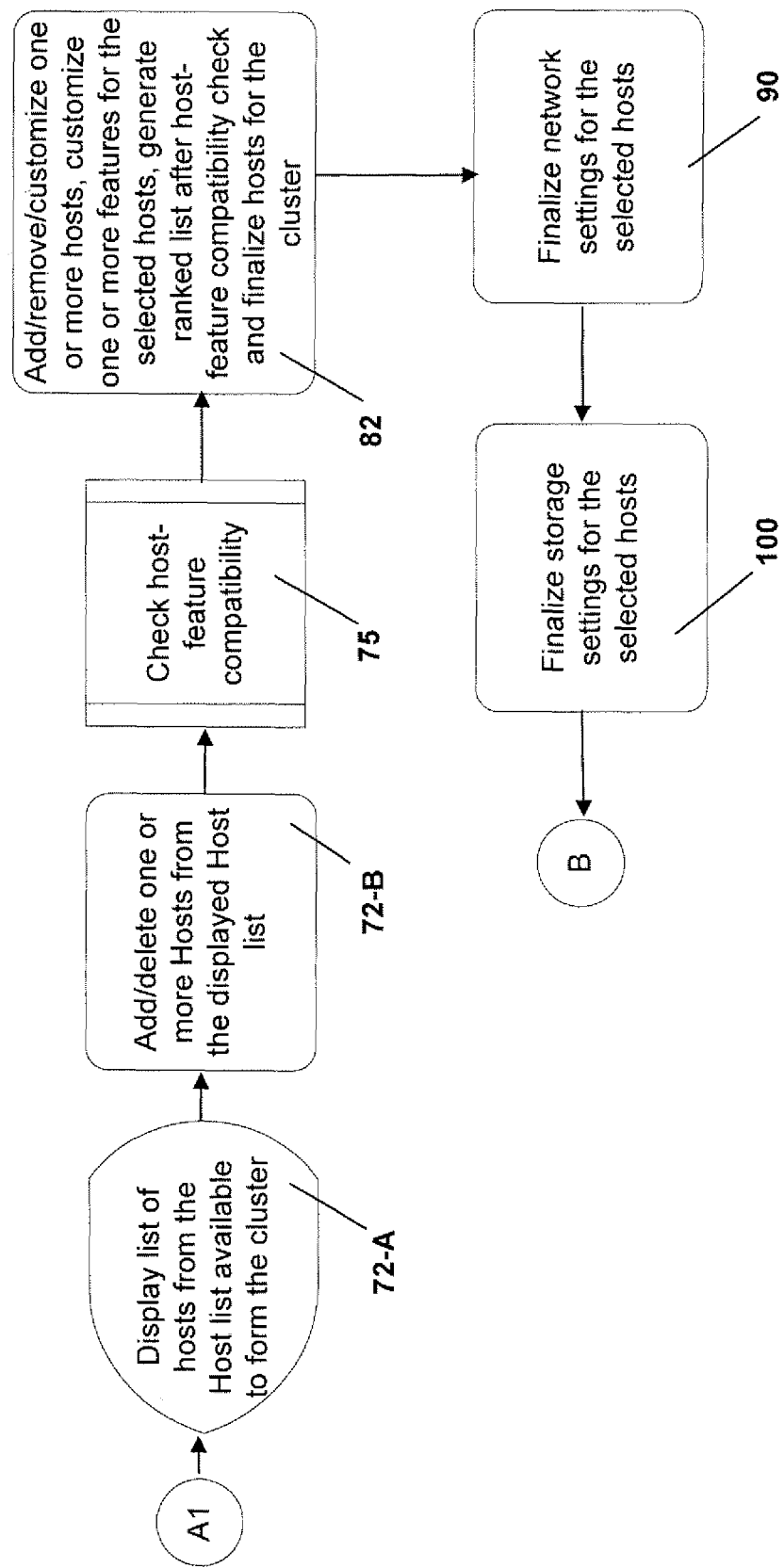
FIG. 2C illustrates workflow operations used in selecting hosts and configuring the features based on the selected hosts during guided cluster configuration, in one embodiment of the invention.

FIG. 2C illustrates another embodiment for constructing a cluster. In this embodiment, a plurality of hosts are selected and the features, network setting and storage setting are customized for the selected hosts. During compatibility analysis at operation 60 of FIG. 2A, if the hosts in the Host list are not compatible with the features in the Features list, then one or more hosts are selected and/or de-selected so that host-feature compatibility can be established. FIG. 2C illustrates the workflow process of selecting/de-selecting hosts and using the selected hosts for forming the cluster. To assist in the selection/de-selection of hosts, a host-selection subroutine within the compatibility module or a distinct host-selection module is used. The host-selection module retrieves and forwards a initial list of hosts along with the associated information to the client for rendering and selection, as illustrated in operation 72-A. The hosts, in one embodiment, can be selected by the host-selection module using a set of parameters that may filter the hosts in the Host list. The hosts may or may not be running. The host-selection module provides a user interface for rendering a list of hosts and for adding and/or removing hosts from the current cluster. The initial list of hosts includes default capabilities that is obtained from the Host list maintained in the configuration database. Upon rendering the hosts, a compatibility analysis is executed to identify a set of features whose requirements are satisfied by the capabilities of the hosts in the rendered list. The list of features whose requirements are satisfied by the one or more hosts is identified and returned to the client for rendering and approval. The compatibility analysis provides a ranking for each of the hosts based on the compatibility of the hosts with the identified features requirements. The compatibility module provides a plurality of suggested adjustments to particular hosts/features to make the particular hosts more compatible with the requirements of the features. The suggested adjustments are accompanied with a plurality of guided tutorials to help in resolving any compatibility issues amongst the hosts and between the hosts and the features requirements. The list of hosts are finalized for the cluster based on the compatibility analysis and the configuration settings within the configuration template are updated to reflect the configuration settings for the cluster and the hosts are configured using the updated configuration settings within the configuration template to form a most optimal cluster. The process then proceeds to operation 90 where network settings are finalized as and upon finalizing the network settings the process proceeds to operation 100 where storage settings are finalized for the cluster described with reference to FIG. 2B. Once the network and storage settings are finalized the process proceeds to update the configuration template to reflect the updated settings of the hosts, features, network and storage.

If the current settings of hosts, features, network and storage are acceptable, the configuration template is updated to the configuration database and the compatible hosts are configured using the configuration settings in the configuration template so as to enable the features for the cluster.

If, on the other hand, the compatibility analysis identifies some issues, then either the feature requirements or hosts capabilities need to be adjusted to make the hosts and features compatible to form the cluster. Adjusting the feature requirements were discussed with reference to FIG. 2B. In the embodiment discussed in FIG. 2C, the host-selection module provides list of hosts and the user interface to add/delete hosts and provide guided tutorial to fix any issues that may arise during the configuration of the cluster. The tutorials provide guidance in adding or deleting hosts, editing/upgrading one or more hosts' capabilities and edit/adjust feature requirements so that the hosts are compatible with the available features. The host-selection module provides a detailed list of capabilities of each host in the Host list at the user interface so that a user can make informed decision of which hosts to keep and which ones to delete.

One or more hosts are added/deleted one at a time using host names or in a group using a file with a list of host names, as shown in operation 72-B. In one embodiment, one or more hosts may not be part of the virtual center. The term virtual center (VC) as used herein means a management software that provides a mechanism to configure and manage one or more hosts, virtual machines (VMs), and other components of virtualized infrastructure. In such a case, the list may include host address, such as Media Access Control (MAC) address, and log-in information. The VC can then use this information to access the hosts and obtain host related information, such as hosts' capabilities, etc. In this embodiment, the Host list may not include this information, as these hosts are not part of the virtual center. The term virtual center (VC) as used herein means a management software that provides a mechanism to configure and manage one or more hosts, virtual machines (VMs), and other components of virtualized infrastructure. When new hosts are added to the host list, the capabilities of the newly added hosts are updated to the Host list and dynamically rendered at the user interface. If one or more hosts are deleted from the list, the corresponding capabilities of the hosts are removed from the list of hosts for the cluster so that the deleted hosts are not considered during the host-feature compatibility analysis. The dynamic rendering of changes to the hosts at the user interface enables a user to view the changes and to adjust the customization to ensure that host capabilities are compatible with feature requirements in order to take advantage of the advanced features in the cluster.

Upon addition/deletion of hosts from the Host list for the cluster, the compatibility module performs a host-feature compatibility analysis to determine if there is compatibility between the remaining hosts and the features, as illustrated in operation 75. For instance, the newly added hosts may not include the required resources to satisfy one or more features that were available in the cluster or may include capabilities that are not compatible with the rest of the hosts in the Host list that are selected for forming the cluster. In such cases, the host-feature compatibility analysis will identify the incompatibility issues. Based on the compatibility analysis, the compatibility module may provide guided tutorials and best-practice recommendations to resolve the issues. One of the recommended resolutions may be to add/remove/customize one or more hosts and adjust the requirements of one or more features in the cluster, as illustrated in operation 82. The compatibility module provides tutorials to customize the features by enabling addition/deletion/customization of one or more requirements of the features so that the hosts can pass the compatibility analysis. Adjusting the requirements of one or more features has been discussed with reference to FIG. 2B.

The addition/deletion of hosts may be better explained by the following example. For instance, a Host list used in cluster configuration may identify 10 hosts that are available for forming a cluster. Logic within the compatibility module evaluates the capabilities of all the 10 hosts in the Host list during compatibility analysis to determine the minimum capability that these hosts have and determines the feature(s) whose requirements the minimum capability can satisfy. During the process of evaluation, the compatibility module may determine that all the hosts in the Host list are configured to provide High Availability (HA) feature in the cluster. The compatibility module additionally determines if one or more hosts have the capabilities to comply with additional feature requirements. From the above example, the compatibility module may identify 3 hosts that are both HA and Distributed Resource Scheduling (DRS) compatible and may determine that the remaining 7 are HA compatible but are not DRS compatible. The configuration analysis provides ranking of the hosts based on the level of compatibility to various features at the client. The tutorials guide a user through a process of making the remaining 7 hosts DRS compatible while maintaining HA compatibility.

In one embodiment, when new hosts are added to the cluster, the Host list is dynamically updated with the resources of the new host. In this embodiment, the new hosts may be added one at a time using host names or may be added as a group through a file with a list of host names. Similarly, when hosts are deleted from the cluster, the Host list is dynamically updated to reflect the deletion. Based on the addition/deletion of hosts, the list of features that can be satisfied with the current list of hosts is also dynamically adjusted. The compatibility module interacts with the cluster review module to dynamically update the ranking of the hosts to reflect the current ranking of the hosts in the cluster based on the level of compatibility of the hosts in the cluster to the features. The ranking of the hosts are updated such that the hosts that are fully compatible with the features requirements are ranked at the top and the hosts with no compatibility or low compatibility are ranked at the bottom with the rest of the hosts ranked in-between based on the level of match of the hosts capabilities against features requirements. Further, the rendering of the hosts at the user interface is dynamically adjusted by the cluster review module to reflect the current ranking. In addition to the ranked list, guided tutorials help in choosing the most compatible hosts from the ranked list that meets the requirements of the cluster.

It should be noted that even though some of the hosts are compatible with requirements of one or more features, there may be instances when one or more of the hosts are not compatible with one another as one or more of the hosts include capabilities that are not compatible with the capabilities of other hosts in the cluster, even though the hosts individually are compatible with the features, such as HA and/or DRS. For instance, during cluster configuration to select hosts for using DRS feature, the list of hosts within the VC may include hosts from rival companies (such as Intel and AMD) or from companies that are not compatible with each other. For the DRS feature, the cluster configuration software may identify 6 hosts that are compatible—3 hosts from Intel and 3 hosts from rival AMD. In this case, at any time, any one host is only compatible with 2 other hosts in order to use the DRS feature. During compatibility check, even though 6 good hosts are identified, as soon as a particular host is selected (say, Intel host), the rival AMD hosts become incompatible. In another instance, during cluster configuration, the configuration software may identify 6 hosts with 5 hosts having Fibre Channel Storage Area Network (FC SAN) connectivity but no hardware Internet Small Computer System Interface (iSCSI) while the $6^{th}$ host has iSCSI but no FC SAN connectivity. The 5 hosts with FC SAN may be able to connect to iSCSI using software iSCSI but such connectivity would provide sub optimal performance. However, the $6^{th}$ host with the hardware iSCSI has no way of connecting to the SAN. In this case, during cluster configuration, all 6 hosts are presented to the user with appropriate text to indicate that adding the $6^{th}$ host with the hardware iSCSI may not provide optimal performance as the inclusion of this host would cause the remaining 5 hosts to use software iSCSI to ensure that all the hosts can access the shared storage.

Thus, during customization, the compatibility module verifies each host independently to see if each host has the capabilities to satisfy the requirements of one or more of the features available in the Features list. In order to ensure that the selected hosts and features are compatible, the compatibility module performs a compatibility analysis and ranks the hosts based on the compatibility analysis. When issues are found, the compatibility module guides a user through the process of making the newly added/customized hosts compatible with the desired features by providing recommendations and/or the necessary tutorial. Based on the issues, the recommendation may be to remove one or more of the newly added hosts since this newly added host is not compatible with the other hosts in the cluster. When the newly added host is removed based on the recommendation, the ranking of the remaining hosts is revised to reflect the current ranking of the hosts for the cluster. Based on the revised ranking, the list of hosts for the cluster is finalized, as illustrated in operation 82. The final list of hosts is configured with the cluster settings so as to make use of the features.

Figure 6A:
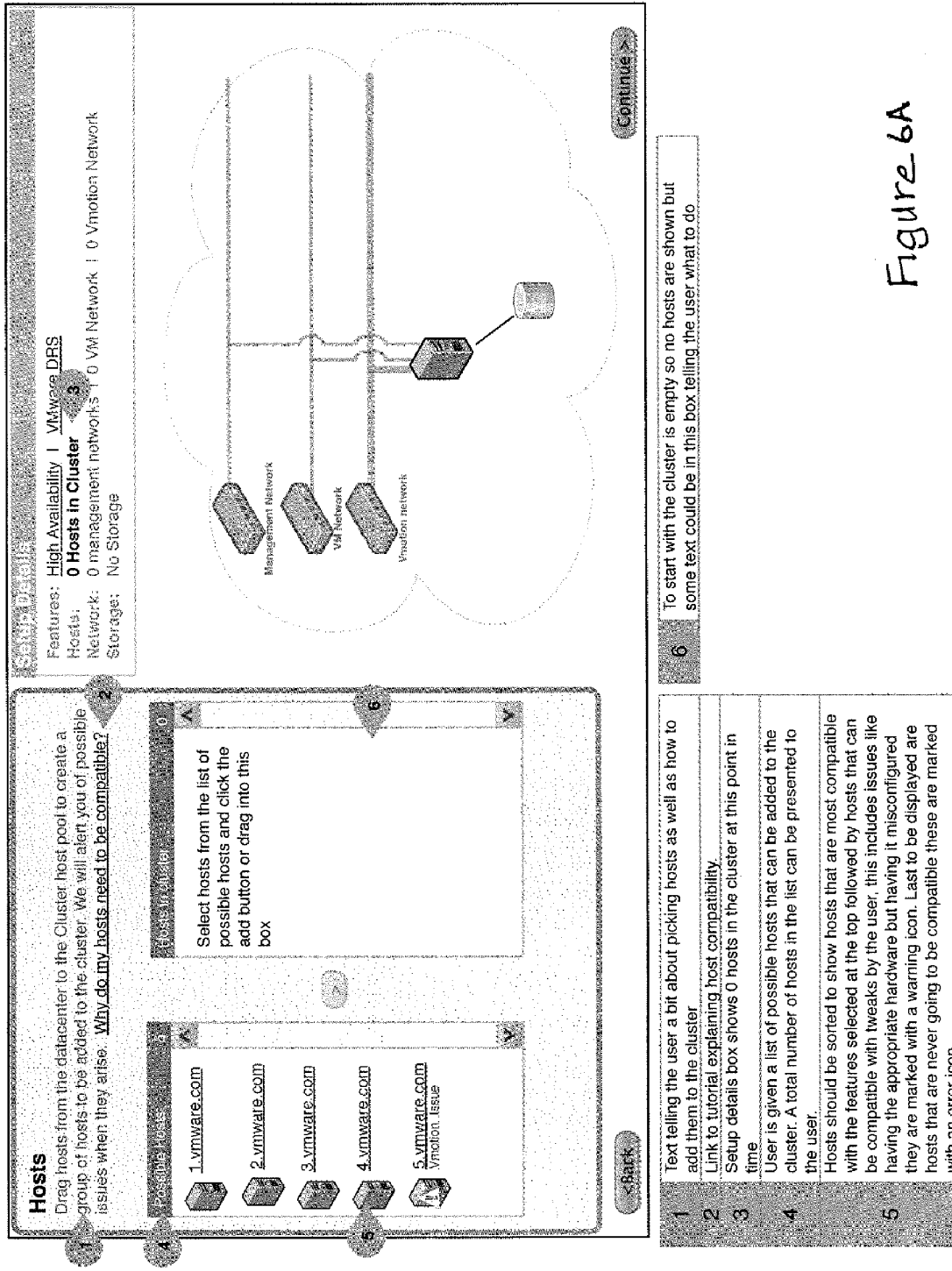

FIGS. 6A-6I illustrate a portion of the user interface used in selecting the appropriate hosts for the cluster. FIG. 6A illustrates the initial list of possible hosts available for forming the cluster. The host in the initial list are subjected to a compatibility analysis wherein the hosts are ranked based on their compatibility with the features with the most compatible hosts rendered at the top and hosts with most issues rendered at the bottom of the list. This type of ranking the hosts may be to encourage a user to select the most compatible hosts for the cluster. Additionally, each of the hosts rendered include details regarding their capabilities so that the hosts may be selected based on their capabilities. Thus, as shown in FIG. 6B, when a user selects a particular host from the rendered list, the details of the selected host including the selected host's capabilities are rendered in a pop-up window. The rendering of the details of the selected host illustrated in FIG. 6B is exemplary and should not be considered limiting. Other ways of rendering the details of the host may be employed.

Figure 6C:
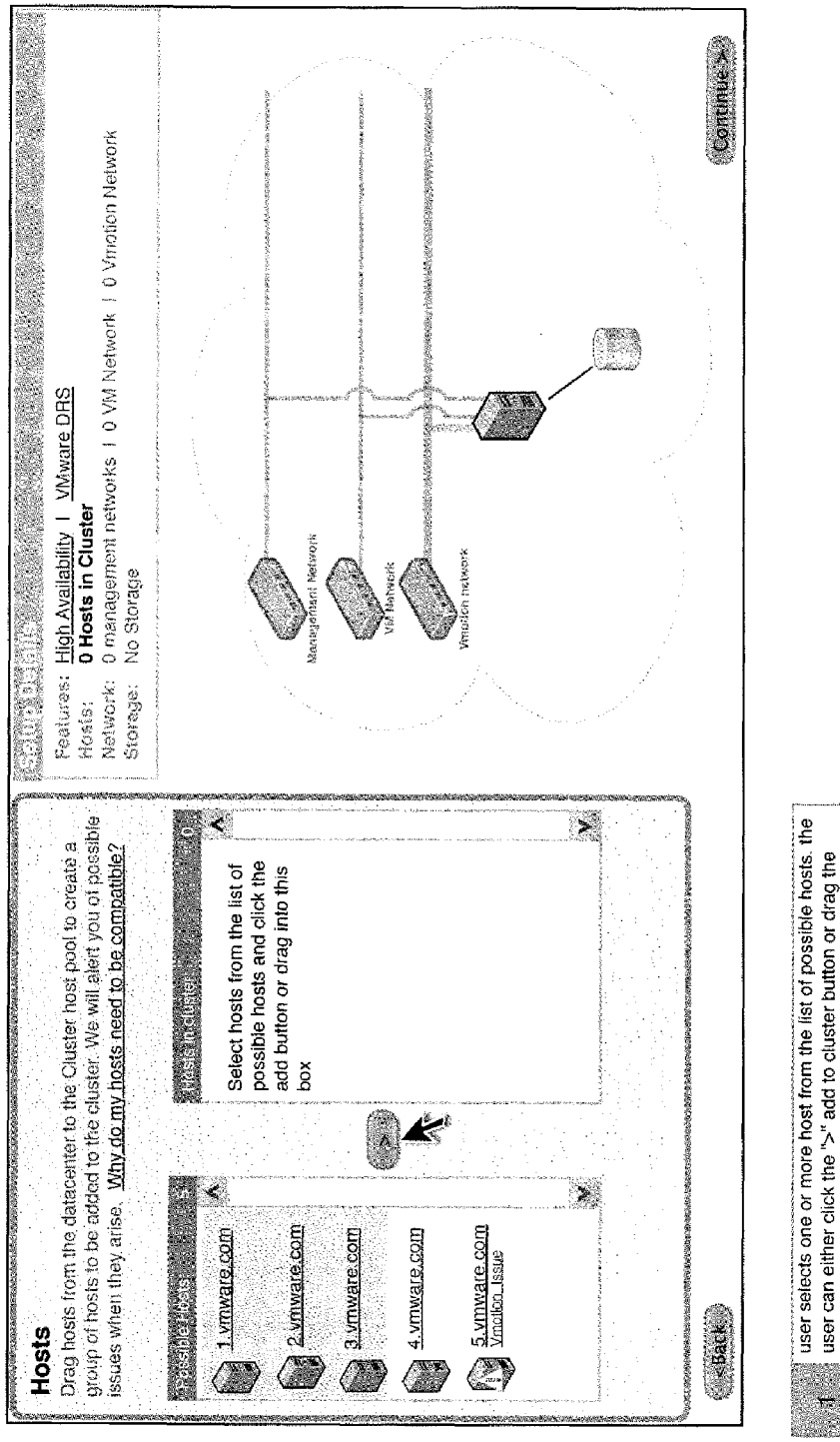
Figure 6D:
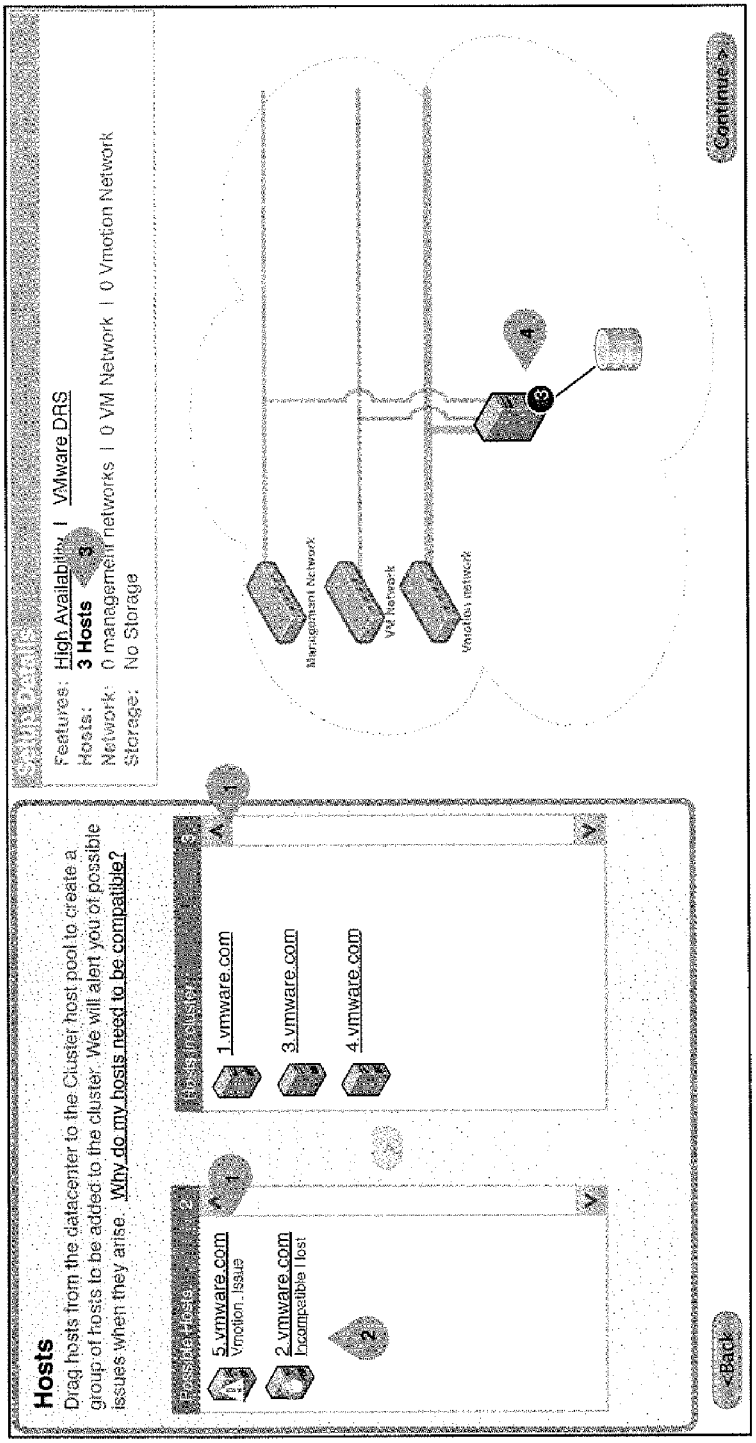

The hosts are selected from the Host list and rendered under "possible host list" for the cluster. The user interface provides means to select the hosts from the possible host list to the cluster list, as illustrated in FIG. 6C. In FIG. 6C, an add button is provided to move the hosts from the possible host list to the cluster list. Other means of moving the hosts from the possible host list to the cluster list may be employed, such as drag-and-drop or double-click option. When the most compatible hosts are selected for forming the cluster, the selected hosts are removed from the possible hosts list and added to the cluster list, as illustrated in FIG. 6D. Additionally, the information associated with the addition of hosts to the cluster list is conveyed to the "Setup Details" box, as shown by bubble 3, and the cluster map, as shown by bubble 4 in FIG. 6D.

Figure 6E:
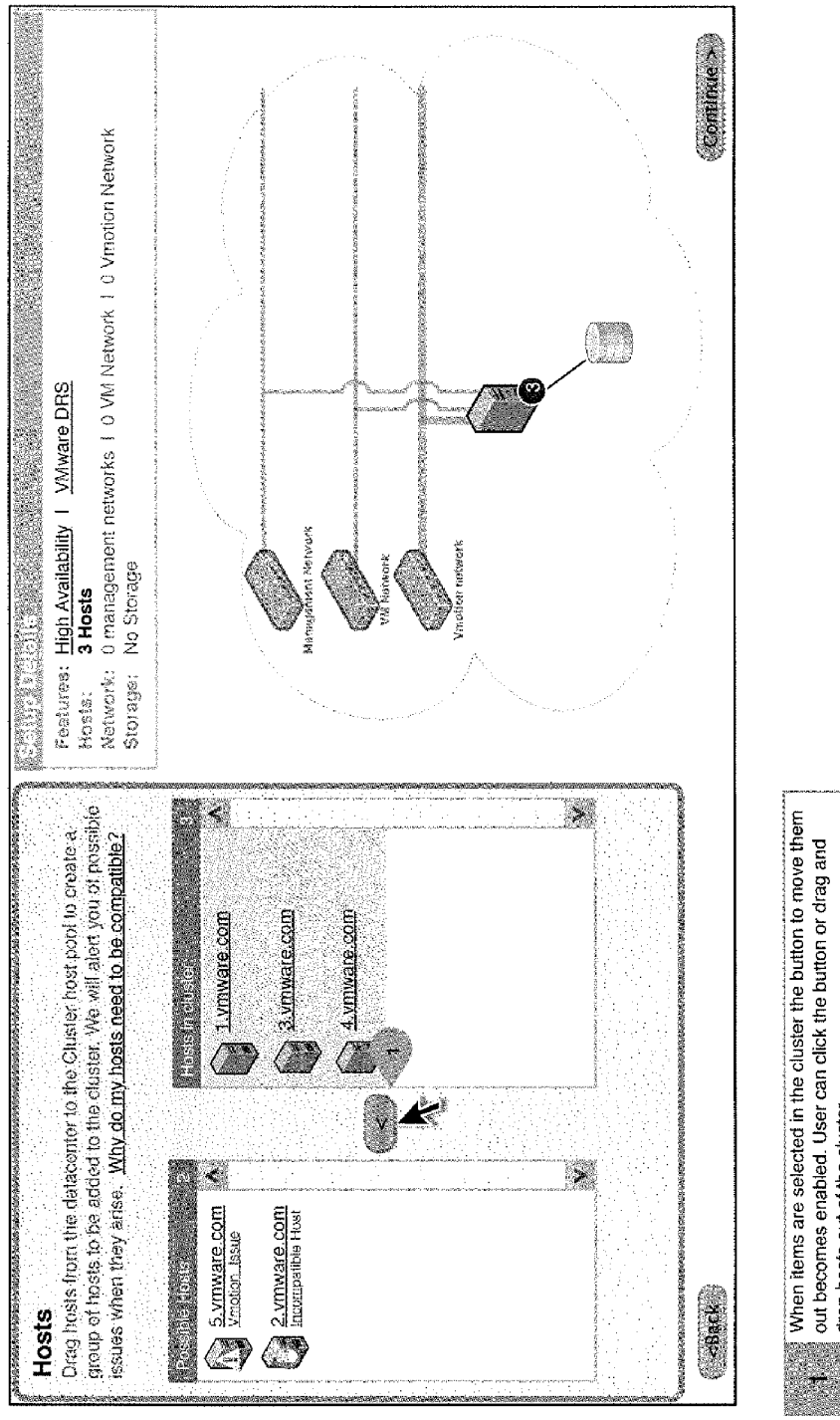
Figure 6F:
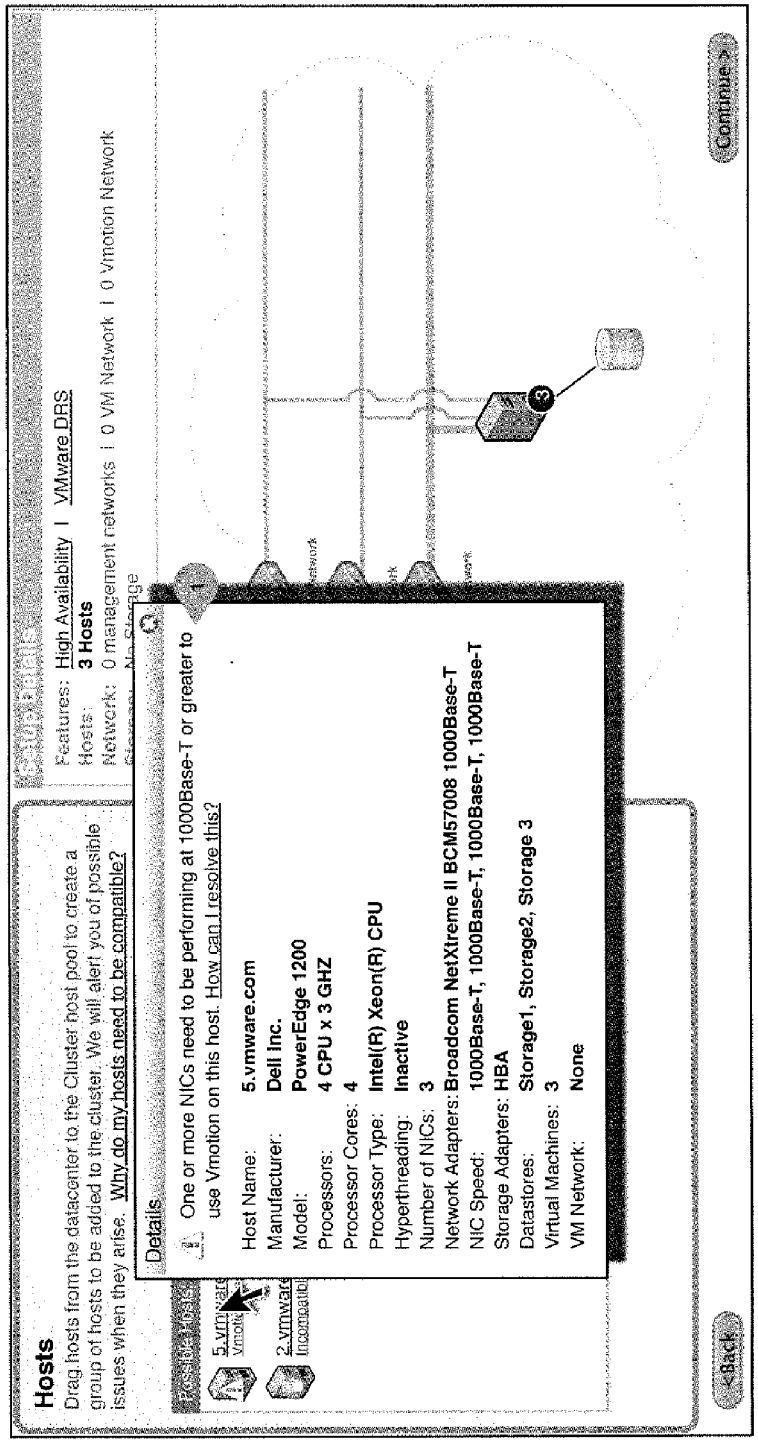

During the addition of the hosts, any issues encountered by the hosts are also rendered in the user interface. The issues include incompatibility with other hosts and incompatibility with selected features. Option to move the incompatible hosts from the cluster list is provided at the user interface, as shown in FIG. 6E. The option to remove host from the cluster list is provided as "delete" button or through other options, such as double-click or drag-and-drop option. A user can click on a host with an issue and a detail box with details of the host including details of issue encountered at the host is rendered, as illustrated in FIG. 6F. Additionally, links to tutorials are also rendered to guide a user to resolve the issue.

In one embodiment, based on the ranking, a plurality of hosts from the possible hosts list that are most compatible with the features are automatically selected for forming the cluster and moved to the cluster list by the cluster review module, as illustrated in FIG. 6D. The plurality of hosts for the cluster are automatically selected based on pre-defined rules, in one embodiment of the invention. The pre-defined rules may enable the cluster review module to select the most compatible hosts whose capabilities match all the requirements of all the features selected for the cluster or the hosts with specific capabilities or the hosts that are capable of supporting specific application(s) on the cluster. In another embodiment, the cluster review module allows for manual selection of the hosts based on user knowledge of which hosts are most suitable for satisfying the cluster's requirements.

Upon selection of the hosts either automatically or manually, the cluster review module dynamically re-ranks the hosts based on the level of compatibility and returns the re-ranked list of selected hosts for rendering at the client. In one embodiment, the cluster review module re-ranks the selected hosts such that the hosts with most compatibility issues are ranked and rendered at the top while the hosts with the most compatibility are ranked at the bottom. The hosts with issues may be rendered in such a way as to let a user to not only know which hosts have issues but also to let them know what types of issues these hosts have. The re-ranking of selected hosts is opposite to the ranking accorded to the initial set of possible hosts discussed earlier with reference to FIG. 6A. This type of re-ranking may be employed to alert a user of the issues in each host so as to encourage the users not to select the hosts that have issues and to select the hosts that are most compatible for forming the cluster. For instance, host(s) with issue of incompatible processors compared with the rest of the hosts may have to be removed from the cluster while the host(s) with issue of insufficient bandwidth may be included in the cluster after upgrading the host(s) bandwidth. Thus, the host(s) with incompatible processors may be ranked higher than the host(s) with insufficient bandwidth.

Figure 6G:
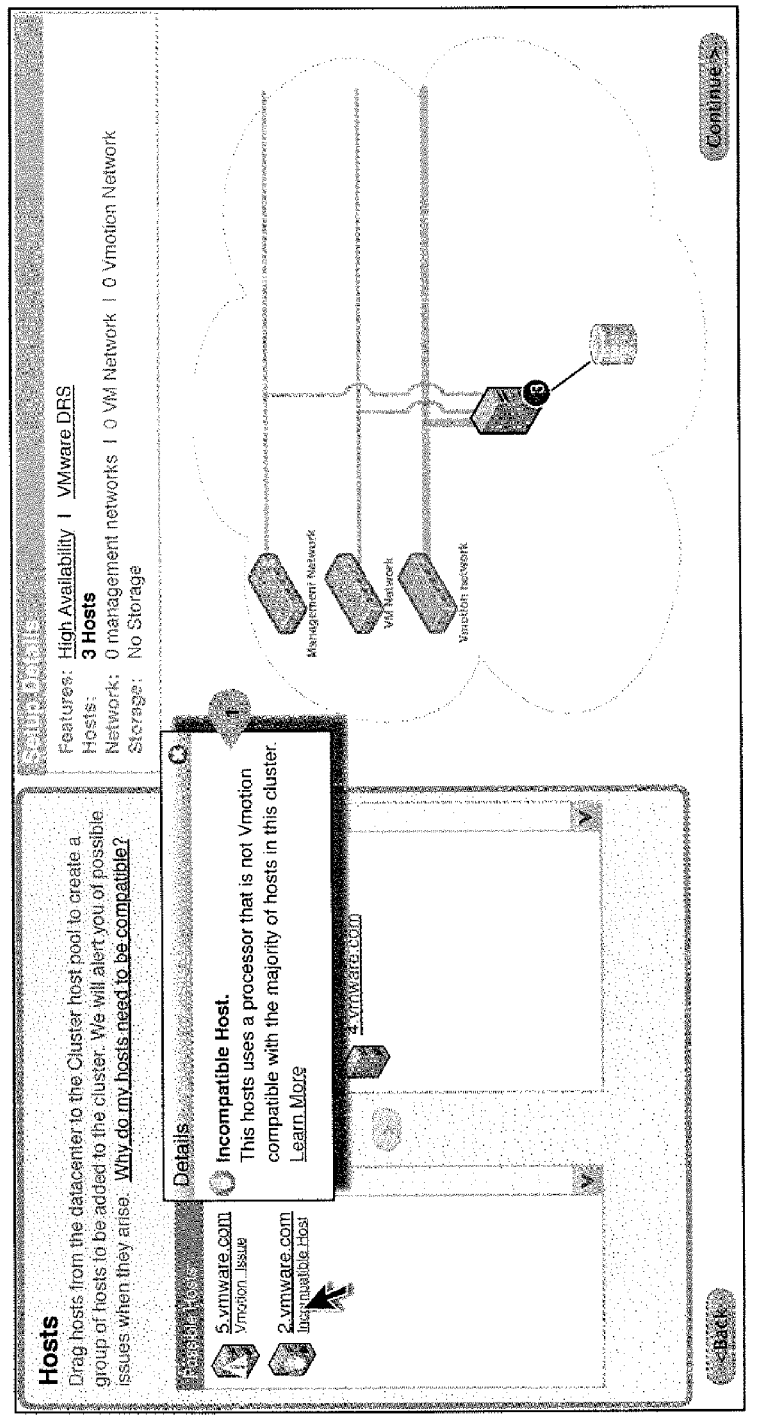
Figure 61:
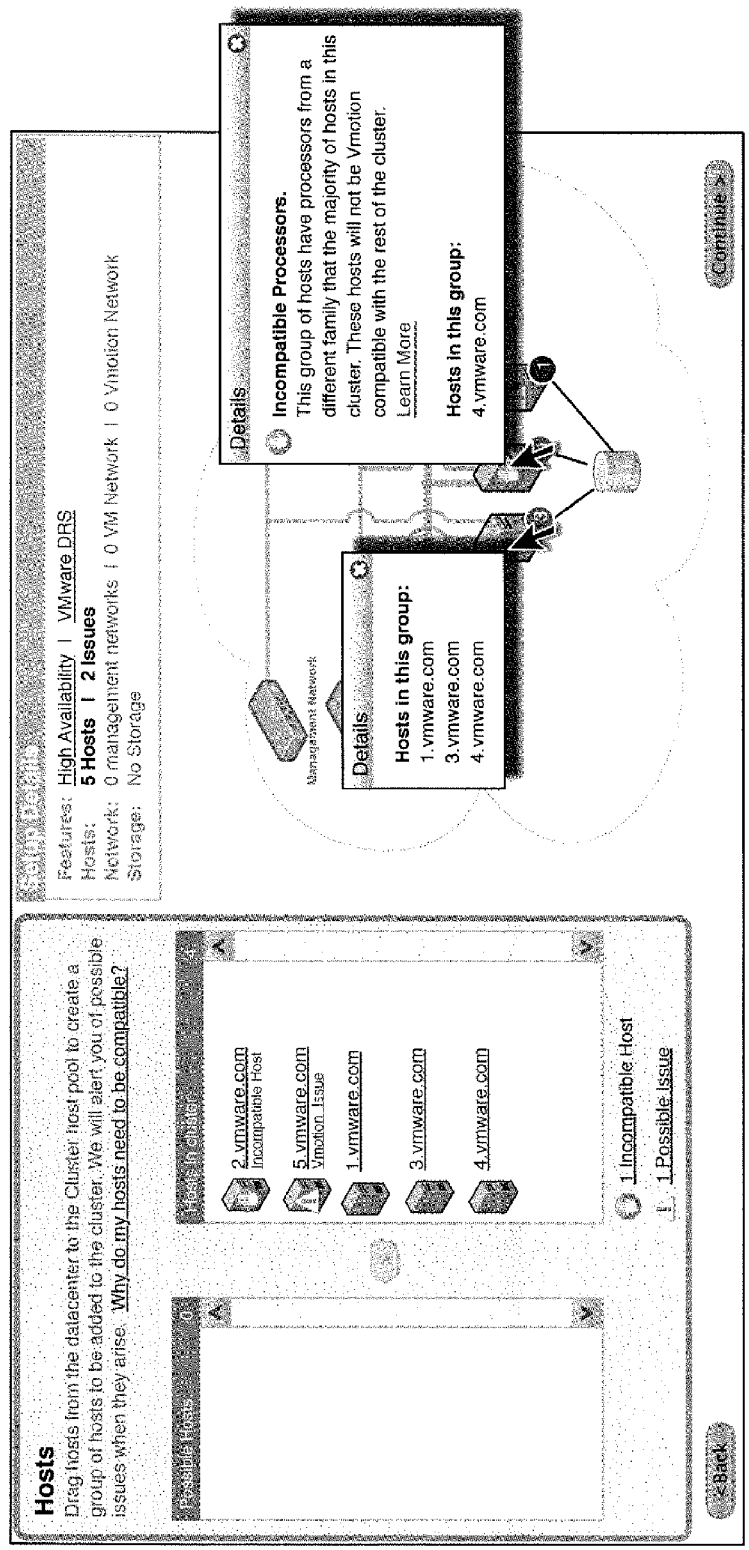

FIG. 6G illustrates some of the issues encountered when one or more incompatible hosts are selected for forming the cluster. In one embodiment, the host with issue that cannot be resolved may be flagged red or have an error flag and is ranked higher while hosts with issues that can be resolved may be flagged yellow or have a warning flag and is ranked lower while hosts with no issues may be flagged green and is ranked at the bottom. Thus, for instance, the host(s) with incompatible processor may be flagged red while the host(s) with insufficient bandwidth for using a selected feature may be flagged yellow. It should be noted that the aforementioned embodiment is one way of flagging the hosts with issues and other ways of flagging the issues may also be employed. When the incompatibility of particular hosts are resolved using guided tutorials, the ranking of the hosts in the cluster are dynamically refined to reflect the latest ranking based on the resolution at the particular hosts. Additionally, the flags are reset to reflect the current compatibility status of the hosts with the features requirements.

When hosts with incompatible issues that can be resolved are configured, the compatibility module provides details of the issue and the name of the host that has the incompatible issue, as shown in FIG. 6H. If the cluster configuration proceeds with the hosts having issues, then appropriate errors and warnings are provided along with links to tutorials in the user interface to enlighten a user of the incompatible hosts and the possible resolutions/recommendations to resolve the issue. Thus, as can be seen in FIG. 6I, the hosts with issues are ranked such that the host with the most serious issue is ranked at the top of the cluster list and is reflected in the cluster map and setup details section of the user interface page with appropriate links.

The user interface for addition/deletion of hosts provides ways to evaluate various combinations of hosts before selecting and committing the most suitable hosts for the cluster. The addition/deletion option enables one to pick hosts that best fit the needs of the cluster by rendering the most compatible hosts first, providing details of why a host is not a good choice for a cluster, validating host compatibility with other hosts and with the features of the cluster, and offering possible resolutions for host incompatibilities when possible. When the cluster review module selects hosts, the cluster review module checks for compatibility of the selected hosts with all features for a cluster by applying the relevant checks based on the selected features. The host compatibility module also checks to ensure that networking and storage compatibility is available or at least achievable.

After ensuring the host-feature compatibility, the compatibility module finalizes the network settings and storage settings, as illustrated in operations 90 and 100, respectively. The network settings and storage settings may be customized based on the selected hosts and features. Customization and compatibility of network settings and storage settings are similar to what has been discussed with reference to FIG. 2B.

After selecting the features, network settings and storage, the process returns to operation 65 as described above with reference to FIG. 2A wherein the host configuration template is created. The host configuration template, at this time, will include the customizations associated with the features, hosts, network settings and storage settings. A configuration list is generated from the host configuration template, as illustrated in operation 105 and rendered at the user interface for confirmation (operation 110). If the configuration list is approved (decision point 120), the configuration template is written to cluster configuration database, as illustrated in operation 130, and the configuration is applied to each of the hosts in the cluster, as illustrated in operation 140. If the configuration is not approved, the process returns to operation 72-A wherein hosts from the Host list are rendered for further addition/deletion/customization and the process continues till the configuration is approved. Aside from allowing selection and customization of features and hosts, the configuration software includes logic to select, customize and finalize settings for shared storage and network.

Figure 7:
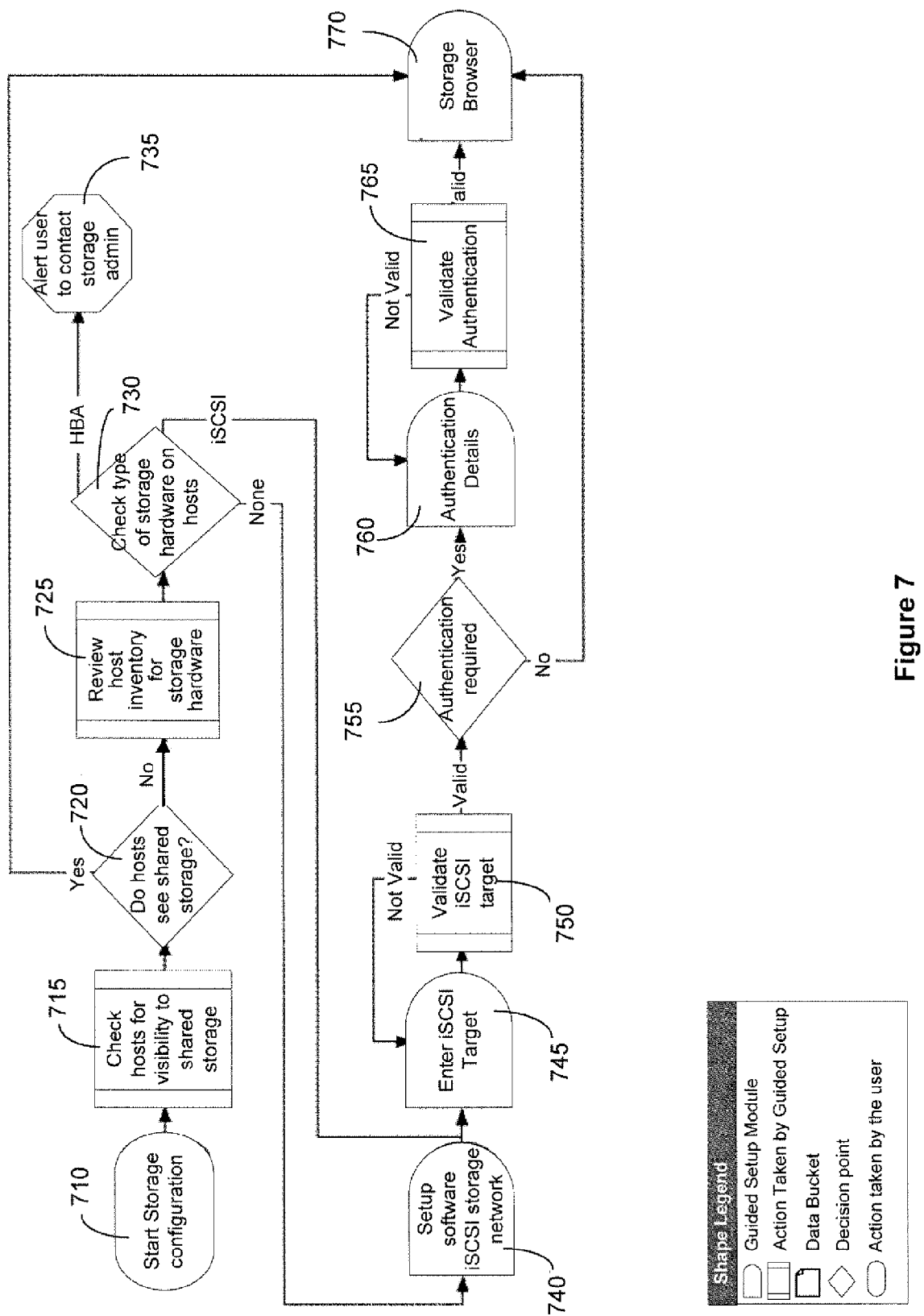
FIG. 7 illustrates an overview of a workflow for configuring storage, in accordance with one embodiment of the invention.

FIG. 7 illustrates a sample storage workflow for configuring storage for the cluster. The storage workflow for setting up shared storage described herein is similar to any standard storage workflow protocol used in setting up a shared storage. A storage module is used in evaluating various storage options and defining the best storage options for the cluster based on connectivity. Once the hosts and features are finalized for the cluster configuration, the storage module within the cluster configuration software is executed to select and finalize the storage settings for the cluster, as illustrated in operation 710. The storage settings depend on the features and hosts selected for the cluster. The storage module verifies to see if the selected hosts have visibility to shared storage, as illustrated in operation 715. If there is more than one shared storage available and visible to all the hosts, the storage module will evaluate the shared storage, rank the shared storage and present all the shared storage in the order of ranking so that the user can pick the ones to opt out. Additionally, storage devices that are not connected to the hosts but are available in the VC are also presented with reasons as to why these storage devices should not be used during cluster configuration. Alternately, the storage module may provide a ranked list of shared storage along with shared storage recommendations in a user interface for a user to select.

If the hosts are able to see the shared storage, as illustrated in decision box 720, the storage module finalizes the recommended shared storage settings, as illustrated in operation 770. If the hosts are not able to see the shared storage, then the storage module reviews the hosts' inventory to determine storage hardware available at each of the hosts, as illustrated in operation 725. The storage module then evaluates the type of storage hardware at each host, as illustrated by decision point 730. If the storage hardware is a host bus adapter (HBA), then the storage module sends an alert to the user to contact storage administrator to resolve the storage issue, as illustrated by operation 735. If the storage hardware is an Internet Small Computer System Interface (iSCSI), the storage module retrieves iSCSI Target information, as illustrated in operation 745. If there is no storage hardware detected by the storage module, the process proceeds to operation 740 where iSCSI storage network setup software is initiated.

The process then flows to operation 745 where the storage module retrieves the iSCSI target information. The retrieved iSCSI target information is validated, as illustrated in operation 750. If the iSCSI target information is invalid, process control returns to operation 745 where another iSCSI target is retrieved for validation. If, on the other hand, the iSCSI target information is valid, the storage module determines if authentication is required to access and use the storage, as illustrated by decision point 755. If authentication is required, the process proceeds to obtain authentication details for the storage hardware, as illustrated in operation 760. If authentication is not required, the process proceeds to operation 770 where the storage module finalizes the shared storage settings. The authentication detail for the storage hardware is validated at operation 765. If the authentication detail is not valid, then the process returns to operation 760 where authentication detail is retrieved. If the authentication detail is valid, the storage settings is finalized for the cluster using the selected storage hardware.

Figure 8A:
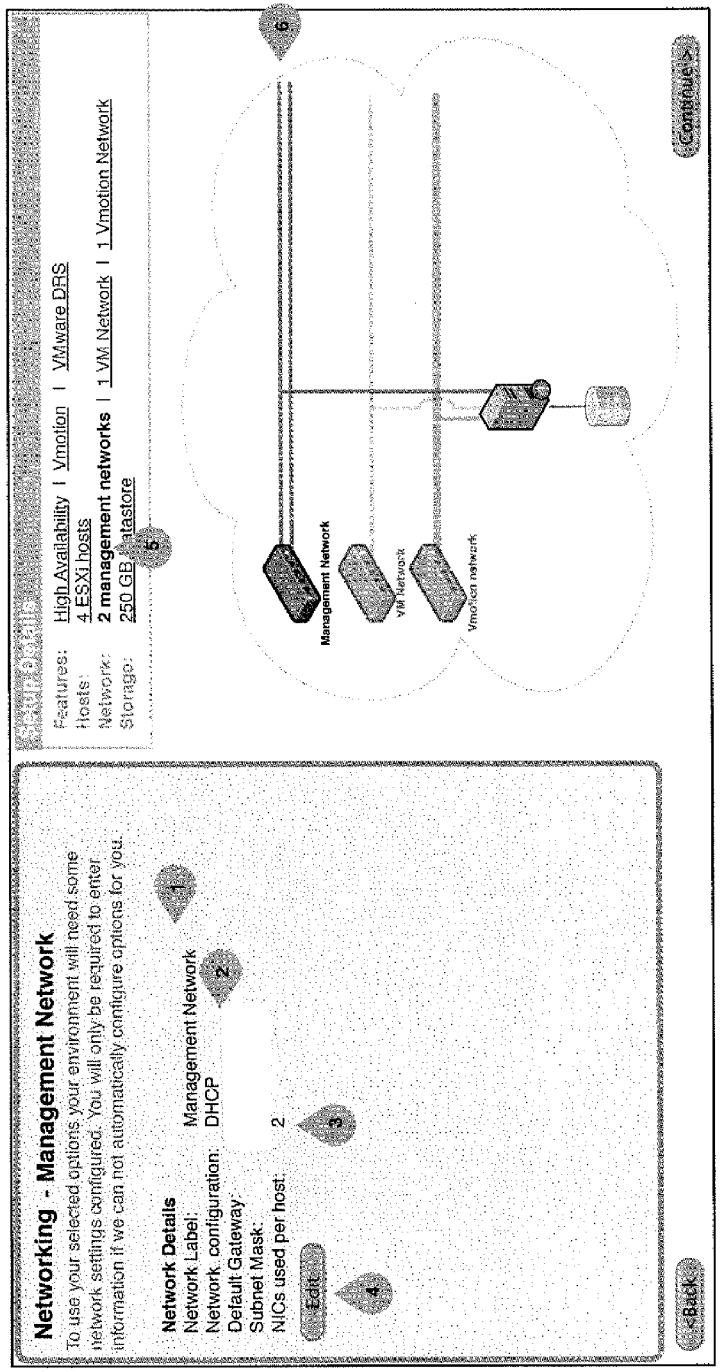
Figure 8B:
Figure 8C:
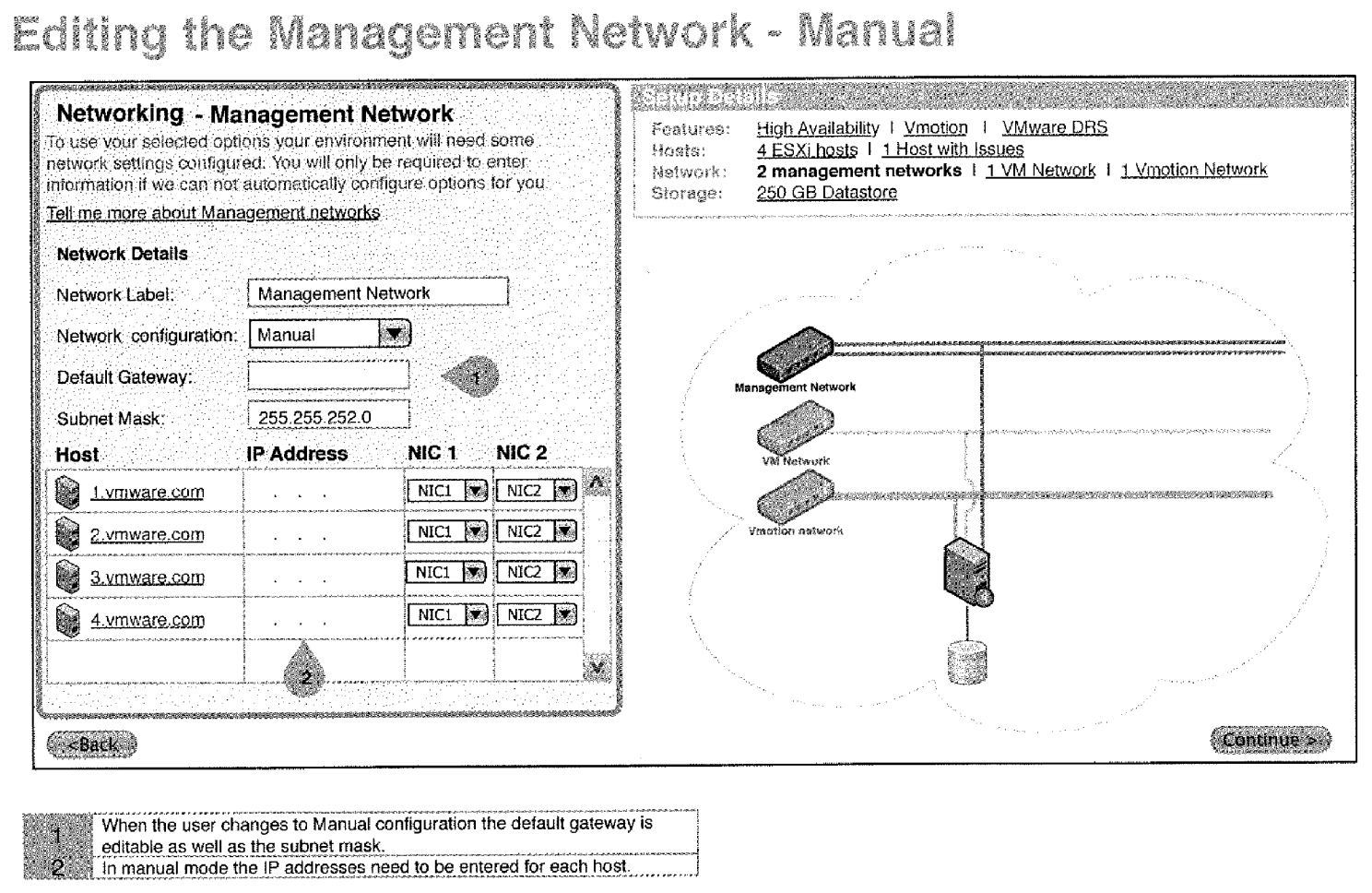

The network settings are performed using the networking module within the guided configuration software (GCS) (also known as configuration software). The GCS uses the default network settings obtained during the installation stage. One or more networks are configured using the default network settings. By default, a management network is provided using the default network settings. One or more additional networks may be configured based on the selected features. For instance, if the cluster includes the live migration feature, then the networking module will automatically configure a live migration network with recommended settings. Live migration is a technology that allows migration of live running virtual machines from one host to another while maintaining continuous service availability. FIGS. 8A-8C illustrate a snapshot of a portion of a user interface page for management network configuration recommended by the networking module. Similar process can be used to configure other networks for the cluster. The Sandbox section of the user interface is populated with details of the management network settings. As mentioned earlier, most of the network settings are obtained from initial installation of the hosts and network devices. The management network configuration uses the default dynamic host configuration protocol (DHCP) so that user input is not required for entering internet protocol (IP) addresses for each host. Upon selection of the default network settings, the management network configuration provides the user with the ability to change the default network configuration to suit the requirements of the cluster. As can be seen from FIG. 8A, the management network configuration provides details of all the settings and provides the ability to customize the settings.

FIG. 8B illustrates the various settings that are editable within the management network configuration when customization of network settings is desired. The networking module allows a user to edit the network label, network configuration from the default DHCP to Manual, IP addresses and the available NICs. If a user enters information that conflicts with the available network resource settings, the networking module issues warning and/or error messages to alert the user of potential incompatibility. For instance, if the default settings include 2 NICs from the same network and the user tries to select a NIC from a different network during customization, the networking module sends an error message indicating the mismatch.

FIG. 8C illustrates a Sandbox section of the user interface when the user selects "Manual" configuration. When the user selects manual configuration, the relevant field settings, including Default Gateway, Subnet Mask, IP Address, NICs become editable fields. When the user enters values in different fields, the networking module dynamically validates each of the entries so that the cluster configuration can be enabled. Although FIGS. 8A-8C illustrate the network setting workflow for a management network, the same workflow is enabled for other networks, such as VM network and VMotion network, etc. It should be noted that the network workflow for setting up a network described above is similar to any standard network workflow protocol used in setting up a standard network.

The management server uses the information in the configuration template and configures the selected hosts based on the cluster configuration. The cluster configuration software improves cluster configuration by putting all the required details related to hosts and features into a workflow so that an optimum configuration can be achieved. The cluster configuration workflow performs automatic configuration, whenever possible, through available knowledge on specific computers, storage devices, and network device requirements. The knowledge is harnessed from information available during installation of the various devices and the software seeks confirmation of the configured data. The software also seeks confirmation when the configuration cannot discover details of specific configuration or when customization is sought. The configuration software guides a user through the configuration process by providing tutorials wherever possible so that a user can make informed decision in choosing the settings for the cluster.

In addition to the aforementioned embodiments, the configuration software can be used to perform post configuration tuning. The tuning process enables growing and optimizing an already defined cluster so as to bring the cluster in line with best practices in the industry. Thus, the recommended components of a cluster comprising the highest number of hosts that support the maximum number of compatible features is presented for approval by a user. If a user does not approve the recommended cluster configuration or wants to fine tune the configuration, then the configuration software provides a plurality of modules and user interfaces to enable the user, such as a system administrator, to manually create a new cluster configuration or fine-tune the existing one. Accordingly, the features module in the configuration software enables the user to select and/or de-select advanced features for incorporation or fine-tuning. The compatibility module checks for host-feature compatibility and/or licensing issues, and provide recommendations to resolve any issues arising from the compatibility analysis. The cluster review module enables a user to add hosts one at a time or in a group, auto-discover existing hosts, select hosts based on recommendations or tutorials, generate a set of recommended hosts based on selected feature requirements, to develop "what-if" tradeoffs for host combinations by providing user interface and to manually elect hosts and features if no recommendations meet the user's needs for the cluster. The storage module enables a user to configure shard storage for the cluster and to pick the best options for shared storage that support advanced features, based on storage compatibility and connectivity. The networking module enables a user to set up network settings by providing default settings based on best practices for reviewing and editing, providing tutorials for explaining various network setting options and providing means for details to be configured automatically, such as employing a range of IP addresses provided by a user.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for constructing a cluster from a plurality of hosts, each host designed to support one or more virtual machines, the method comprising: identifying a plurality of features for a proposed cluster, the plurality of features defining requirements that must be satisfied by hosts to be part of the proposed cluster; identifying hosts to be part of the proposed cluster; determining particular hosts of the identified hosts are lacking one or more of the requirements; presenting a plurality of suggested adjustments to the particular hosts of the identified hosts to enable the particular hosts to be compatible with the requirements; and executing one of the following:
   a) accepting the suggested adjustments for at least one of the particular hosts of the identified hosts to enable the at least one of the particular hosts of the identified hosts to be compatible with the requirements; and constructing the proposed cluster, including configuring the identified hosts for the proposed cluster, thereby forming a constructed cluster and
   b) denying the suggested adjustments for at least one of the particular hosts of the identified hosts; and removing the at least one of the particular hosts of the identified hosts as a candidate for the proposed cluster.

2. The method of claim 1, further comprising ranking each of the identified hosts based on a number of the identified features each of the identified hosts include.

3. The method of claim 2, further comprising removing one or more of the identified hosts that include a ranking lower than a ranking threshold.

4. The method of claim 1, further comprising constructing a configuration template for compatible hosts that are compatible with the requirements, the compatible hosts being designated to be components of the proposed cluster, the configuration template providing configuration settings for the compatible hosts in the proposed cluster, wherein the configuration settings and the suggested adjustments are rendered on a user interface associated with the client.

5. The method of claim 4, wherein constructing the proposed cluster further comprises configuring the compatible hosts for the proposed cluster using the configuration settings in the configuration template, thereby constructing the proposed cluster.

6. The method of claim 1, wherein identifying hosts to be part of the proposed cluster comprises identifying hosts that include a threshold quantity of the identified features.

7. The method of claim 1, wherein presenting a plurality of suggested adjustments further includes providing a guided tutorial for performing each of the suggested adjustments to the particular hosts.

8. A system comprising: a database for storing a list of requirements that must be satisfied by hosts to be part of a proposed cluster; and a processing device programmed to: access the list of requirements; based on the list of requirements, identifying a plurality of hosts to be part of the proposed cluster; determine particular hosts of the identified hosts are lacking one or more of the requirements; present a plurality of suggested adjustments for the particular hosts to enable the particular hosts to be compatible with the requirements; and execute one of the following:
   a) accept one or more of the suggested adjustments for at least one of the particular hosts of the identified hosts to enable the at least one of the particular hosts of the identified hosts to be compatible with the requirements; and construct the proposed cluster, including configuring the identified hosts for the proposed cluster, thereby forming a constructed cluster and
   b) deny the suggested adjustments for at least one of the particular hosts of the identified hosts; and remove the at least one of the particular hosts of the identified hosts as a candidate for the proposed cluster.

9. The system of claim 8, wherein the processing device is further programmed to rank each of the identified plurality of hosts based on a number of requirements in the list of requirements each of the identified plurality of hosts include.

10. The system of claim 9, wherein the processing device is further programmed to remove one or more of the identified plurality of hosts that include a ranking lower than a ranking threshold.

11. The system of claim 8, wherein the processing device is further programmed to construct a configuration template for compatible hosts that are compatible with the requirements, the compatible hosts being designated to be components of the proposed cluster, the configuration template providing configuration settings for the compatible hosts in the proposed cluster, wherein the configuration settings and the suggested adjustments are rendered on a user interface associated with the client.

12. The system of claim 11, wherein constructing the proposed cluster further comprises configuring the compatible hosts for the proposed cluster using the configuration settings in the configuration template, thereby constructing the proposed cluster.

13. The system of claim 8, wherein identifying a plurality of hosts to be part of the proposed cluster comprises identifying a plurality of hosts that include a threshold quantity of the list of requirements.

14. The system of claim 8, wherein presenting a plurality of suggested adjustments further includes providing a guided tutorial for performing each of the suggested adjustments to the particular hosts.

15. One or more non-transitory computer-readable media comprising computer executable instructions that when executed by a processing device, causes the processing device to perform operations comprising: identifying a plurality of features for a proposed cluster, the plurality of features defining requirements that must be satisfied by host computing devices to be part of a proposed cluster; identifying host computing devices to be part of the proposed cluster; determining particular host computing devices of the identified host computing devices are lacking one or more of the requirements; presenting a plurality of suggested adjustments to particular host computing devices of the identified host computing devices to enable the particular host computing devices to be compatible with the requirements; and executing one of the following:
   a) accepting one or more of the suggested adjustments for at least one of the particular host computing devices of the identified host computing devices to enable the at least one of the particular host computing devices of the identified host computing devices to be compatible with the requirements; and constructing the proposed cluster, including configuring the identified-host computing devices for the proposed cluster, thereby forming a constructed cluster; and
   b) denying the suggested adjustments for at least one of the particular host computing devices of the identified host computing devices; and removing the at least one of the particular host computing devices of the identified host computing devices as a candidate for the proposed cluster.

16. The non-transitory computer-readable media of claim 15, wherein the executable instructions further cause the processing device to perform operations comprising constructing a configuration template for compatible hosts that are compatible with the requirements, the compatible hosts being designated to be components of the proposed cluster, the configuration template providing configuration settings for the compatible hosts in the proposed cluster, wherein the configuration settings and the suggested adjustments are rendered on a user interface associated with the client.

17. The non-transitory computer-readable media of claim 16, wherein constructing the proposed cluster further comprises configuring the compatible hosts for the proposed cluster using the configuration settings in the configuration template, thereby constructing the proposed cluster.

18. The non-transitory computer-readable media of claim 15, wherein identifying host computing devices to be part of the proposed cluster comprises identifying host computing devices that include a threshold quantity of the identified features.

19. The non-transitory computer-readable media of claim 15, wherein the executable instructions further cause the processing device to perform operations comprising:
 ranking each of the identified host computing devices based on a number of the identified features each of the identified host computing devices include; and
 removing one or more of the identified host computing devices that include a ranking lower than a ranking threshold.

20. The non-transitory computer-readable media of claim 15, wherein presenting a plurality of suggested adjustments further includes providing a guided tutorial for performing each of the suggested adjustments to the particular hosts.

* * * * *